(12) United States Patent
Takahashi et al.

(10) Patent No.: US 6,333,387 B1
(45) Date of Patent: *Dec. 25, 2001

(54) ETHYLENE COPOLYMER COMPOSITION

(75) Inventors: Mamoru Takahashi; Seiichi Ikeyama; Akira Todo; Toshiyuki Tsutsui; Seiji Ohta; Hajime Inagaki, all of Waki-cho (JP)

(73) Assignee: Mitsui Chemicals Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/703,665

(22) Filed: Nov. 2, 2000

Related U.S. Application Data

(62) Division of application No. 08/798,907, filed on Feb. 12, 1997, now Pat. No. 6,184,297, which is a division of application No. 08/396,888, filed on Mar. 1, 1995, now Pat. No. 5,663,236, which is a continuation of application No. 08/154,465, filed on Nov. 18, 1993, now abandoned.

(30) Foreign Application Priority Data

| Nov. 19, 1992 | (JP) | 4-310615 |
|---|---|---|
| Nov. 19, 1992 | (JP) | 4-310617 |
| Nov. 19, 1992 | (JP) | 4-310618 |
| Nov. 19, 1992 | (JP) | 4-310619 |

(51) Int. Cl.[7] ............ C08L 23/08; C08L 23/16; C08L 23/18
(52) U.S. Cl. .......... 525/240; 525/232; 525/211
(58) Field of Search ............ 525/240, 232, 525/211

(56) References Cited

U.S. PATENT DOCUMENTS

| 3,231,636 | 1/1966 | Snyder | 525/240 |
|---|---|---|---|
| 4,243,619 | 1/1981 | Fraser et al. | 526/128 |
| 4,587,303 | 5/1986 | Turtle | 525/240 |
| 4,793,956 | 12/1988 | Nogiwa | 264/41 |
| 4,801,652 | 1/1989 | Mizutani | 525/240 |
| 4,804,714 | 2/1989 | Olivo | 525/240 |
| 4,937,299 | 6/1990 | Ewen et al. | |
| 5,051,481 | 9/1991 | Taka et al. | |
| 5,122,491 | 6/1992 | Kioka et al. | 502/117 |
| 5,126,797 | 6/1992 | Takahashi | 526/124 |
| 5,171,799 | 12/1992 | Kioka et al. | 526/127 |
| 5,218,071 | 6/1993 | Tsutsui et al. | 526/348 |
| 5,272,236 | 12/1993 | Lai et al. | 526/348.5 |
| 5,278,272 | 1/1994 | Lai et al. | 526/348.5 |
| 5,382,630 | 1/1995 | Stehling et al. | 525/240 |
| 5,464,905 | 11/1995 | Tsutsui et al. | 525/240 |
| 5,707,751 | 1/1998 | Garza et al. | 525/240 |

FOREIGN PATENT DOCUMENTS

| 1306817 | 8/1992 | (CA) |
|---|---|---|
| 0128046 | 12/1984 | (EP) |
| 406912 | 1/1991 | (EP) |
| 0447035 | 2/1991 | (EP) |
| 452920 | 10/1991 | (EP) |
| 0492656 | 12/1991 | (EP) |
| 461848 | 12/1991 | (EP) |
| 5922946 | 2/1984 | (JP) |
| 61028538 | 2/1986 | (JP) |
| 62010150 | 1/1987 | (JP) |
| 90 03414 | 4/1990 | (WO) |
| 9003414 | 4/1990 | (WO) |

Primary Examiner—Donald R. Wilson

(57) ABSTRACT

Ethylene/α-olefin copolymer with olefin type elastomer, each having particular properties, including density and melt flow rate, with a density ratio of elastomer to copolymer of less than 1, provide compostions which have excellent moldability and form films having high mechanical strength.

2 Claims, 1 Drawing Sheet

○ : Composition of the present invention (Ex. 1—Ex. 3)
□ : Conventional composition (Comp. Ex. 1)
△ : Conventional composition (Comp. Ex. 3)

ETHYLENE COPOLYMER COMPOSITION

CROSS-REFERENCE TO RELATED APPLICATIONS

This is a (division) of Ser. No. 08/798,907, filed Feb. 12, 1997, now U.S. Pat. No. 6,184,297, which is a (division) of Ser. No. 08/396,888, filed Mar. 1, 1995, now U.S. Pat. No. 5,663,236, granted Sep. 2, 1997, which is a continuation application of Ser. No. 08/154,465, filed Nov. 18, 1993, which is now abandoned.

FIELD OF THE INVENTION

The present invention relates to an ethylene copolymer composition. More particularly, the invention relates to an ethylene copolymer composition comprising an ethylene/α-olefin copolymer and other polyolefins, and to an ethylene copolymer composition comprising two kinds of ethylene/α-olefin copolymers and other polyolefins.

BACKGROUND OF THE INVENTION

Ethylene copolymers have heretofore been molded by various molding methods, and used in many fields. The requirement for the characteristics of the ethylene copolymers differs depending on the molding methods and uses. For example, when an inflation film is molded at a high speed, it is necessary to select an ethylene copolymer having a high melt tension compared with its molecular weight in order to stably conduct high speed molding without fluctuation or tearing of bubbles. An ethylene copolymer is required to have similar characteristics in order to prevent sag or tearing in blow molding, or to suppress width shortage to the minimum range in T-die molding.

By the way, low density polyethylene obtained by high pressure radical method is applyed to the use of films and hollow containers due to the high melt tension thereof compared with ethylene copolymers produced by using Ziegler type catalyst. However, the low density polyethylene obtained by the high pressure radical method is poor in mechanical properties such as tensile strength, tear strength and impact strength, and further is low in heat resistance and stress cracking resistance.

In contrast, Japanese Patent L-O-P Nos. 90810/1981 and 106806/1985 propose a method for improving moldability by improving the melt tension and die swell ratio of ethylene polymers obtained by using Ziegler type catalysts, especially a titanium type catalyst.

The ethylene polymers obtained by using a titanium catalyst, however, especially the low density ethylene polymers generally have problems such as their broad composition distribution and stickiness of their molded articles such as films.

Of the ethylene polymers prepared by using the Ziegler type catalysts, those obtained by using chromium type catalysts are relatively excellent in melt tension but has a defect of poor heat stability. This is thought to be caused by that the chain terminals of the ethylene polymers prepared by using the chromium type catalysts tend to become unsaturated bonds.

It is known that the ethylene polymers obtained by using a metallocene catalyst from among the Ziegler type catalysts have merits such as a narrow composition distribution and a low stickiness of their molded articles such as films. However, it is described in, for example Japanese Patent L-O-P. No. 35007/1985, that an ethylene polymer obtained by using a zirconocene compound formed from a cyclopentadienyl derivative contains one terminal unsaturated bond per molecule, and hence this ethylene polymer is presumably poor in heat stability similarly to the above-mentioned ethylene polymer obtained by using the chromium type catalyst.

Accordingly, it will industrially be of great value to provide an ethylene copolymer having good heat stability, high mechanical strength and a narrow composition distribution.

By the way, ethylene copolymers generally have no polar group in the molecule and inherently non-polar, so that they are insufficient in adhesion strength to highly polar materials such as metals and polar resins. For these reasons, when such ethylene copolymers are used by bonding them with the highly polar materials, it is necessary to subject the surface of the ethylene copolymer to a flame treatment, a corona discharge treatment, a primer treatment or the like, and hence resulting in a problem of complicated operation.

Accordingly, it will also industrially be of great value to provide an ethylene copolymer composition, which has high melt tension, good heat stability and high mechanical strength and shows sufficient adhesion strength to highly polar materials.

OBJECT OF THE INVENTION

It is, therefore, an object of the present invention to provide an ethylene copolymer composition of good moldability which is capable for giving a film having higher transparency and mechanical strength, and to provide an ethylene copolymer composition having good moldability and excellent transparency which is capable for giving a film having high adhesion strength to highly polar materials.

SUMMARY OF THE INVENTION

The first ethylene copolymer composition according to the present invention is characterized by comprising:

[A1] an ethylene/α-olefin copolymer, which is obtained by copolymerizing ethylene with an α-olefin of 3 to 20 carbon atoms in the presence of a catalyst for olefin polymerization comprising (a) an organoaluminum oxy-compound and (b) at least two kinds of compounds of Group IV transition metals of the periodic table containing a ligand having a cyclopentadienyl skeleton, and which has such properties that:

(i) the density is in the range of 0.850 to 0.980 g/cm$^3$, (ii) the melt flow rate (MFR) at 190° C. under a load of 2.16 kg is in the range of 0.01 to 200 g/10 min, (iii) the melt tension (MT (g)) at 190° C. and the melt flow rate (MFR) satisfy the relation $MT>2.2 \times MFR^{-0.84}$, and (iv) the flow index (FI (1/sec)) defined by a shear rate which is given when a shear stress of molten copolymer at 190° C. reaches 2.4×10$^6$ dyne/cm$^2$ and the melt flow rate (MFR) satisfy the relation $FI<150 \times MFR$;

and

[B1] a high-pressure radical polymerization low-density polyethylene having the melt flow rate (MFR) of 0.01 to 100 g/10 min;

wherein a weight ratio ([A1]:[B1]) between said ethylene/α-olefin copolymer [A1] and said high-pressure radical polymerization low-density polyethylene [B1] is in the range of 99:1 to 6:40.

In the invention, the above-mentioned at least two kinds of compounds (b) of Group IVB transition metals of the periodic table containing a ligand having a cyclopentadienyl skeleton are preferably:

at least one kind of a transition metal compound represented by the following formula [b-I]:

$$ML^1_x \quad \text{[b-I]}$$

wherein M is a transition metal atom selected from Group IVB of the periodic table, $L^1$ is a ligand coordinating to the transition metal atom M, at least two of $L^1$ are groups selected from a cyclopentadienyl group, a methylcyclopentadienyl group, an ethylcyclopentadienyl group and a substituted cyclopentadienyl group having at least one substituent group selected from a hydrocarbon group of 3 to 10 carbon atoms, $L^1$ other than the (substituted) cyclopentadienyl group is a hydrocarbon group of 1 to 12 carbon atoms, an alkoxy group, an aryloxy group, a trialkylsilyl group, a halogen atom or a hydrogen atom, and X is a valence of the transition metal atom M, and at least one kind of a transition metal compound represented by the following formula [b-II]:

$$ML^2_x \quad \text{[b-II]}$$

wherein M is a transition metal atom selected from Group IVB of the periodic table, $L^2$ is a ligand coordinating to the transition metal atom, at least two of $L^2$ are substituted cyclopentadienyl groups having 2–5 substituent groups selected from a methyl group and an ethyl group, $L^2$ other than the substituted cyclopentadienyl group is a hydrocarbon group of 1 to 12 carbon atoms, an alkoxy group, an aryloxy group, a trialkylsilyl group, a halogen atom or a hydrogen atom, and X is a valence of the transition metal atom M.

The ethylene copolymer composition is excellent in moldability. From this composition, a film having high transparency and high mechanical strength can be produced.

The second ethylene copolymer composition according to the present invention is characterized by comprising:
the above mentioned ethylene/α-olefin copolymer [A1] in an amount of 60 to 99% by weight, and
[B2] at least one crystalline polyolefin in an amount of 1 to 40% by weight, said crystalline polyolefin being selected from the group consisting of:
(B-I) an ethylene homopolymer or a copolymer of ethylene with an α-olefin of 3 to 20 carbon atoms having a melt flow rate (MFR) of 0.01 to 100 g/10 min at 190° C. under a load of 2.16 kg and a density of more than 0.900 g/cm³ (with the proviso that (B-I) differs from said ethylene/α-olefin copolymer [A1]),
(B-II) a propylene homopolymer or a copolymer of propylene with at least one olefin selected from ethylene and an α-olefin of 4 to 20 carbon atoms, having a melt flow rate (MFR) of 0.1 to 100 g/10 min at 230° C. under a load of 2.16 kg and a density of more than 0.900 g/cm³, and
(B-III) a homopolymer of an α-olefin of 4 to 20 carbon atoms or a copolymer of α-olefins of 4 to 20 carbon atoms, having a melt flow rate (MFR) of 0.1 to 100 g/10 min at 230° C. under a load of 2.16 kg and a density of more than 0.900 g/cm³.

The ethylene copolymer composition is excellent in moldability. From this composition, a film having good balance between transparency and rigidity can be produced.

The third ethylene copolymer composition according to the present invention is characterized by comprising:
the above mentioned ethylene/α-olefin copolymer [A1] in an amount of 60 to 99% by weight, and
[B3] an olefin type elastomer in an amount of 1 to 40% by weight, said elastomer having such properties that
(i) the density (d) is not more than 0.900 g/cm³, and
(ii) the melt flow rate (MFR) at 190° C. under a load of 2.16 kg is in the range of 0.01 to 100 g/10 min;
a density ratio ([B3]/[A1]) of the density of said olefin type elastomer [B3] to the density of said ethylene/α-olefin copolymer [A1] being less than 1.

The ethylene copolymer composition is excellent in moldability. From this composition, a film having high mechanical strength can be produced.

The fourth ethylene copolymer composition according to the present invention is characterized by comprising:
[A2] an ethylene/α-olefin copolymer, which is obtained by copolymerizing ethylene with an α-olefin of 3 to 20 carbon atoms having such properties that:
(i) the density is in the range of 0.850 to 0.980 g/cm³,
(ii) the melt flow rate (MFR) at 190° C. under a load of 2.16 kg is in the range of 0.01 to 200 g/10 min,
(iii) the melt tension (MT (g)) at 190° C. and the melt flow rate (MFR) satisfy the relation $$MT > 2.2 \times MFR^{-0.84},$$

(iv) the flow index (FI (1/sec)) defined by a shear rate which is given when a shear stress of molten copolymer at 190° C. reaches $2.4 \times 10^6$ dyne/cm² and the melt flow rate (MFR) satisfy the relation $$FI < 150 \times MFR,$$

(v) the molecular weight distribution (Mw/Mn) measured by GPC is in the range of 1.5 to 4, and
(vi) MT/(Mw/Mn) and FI/MFR satisfy the relation $$MT/(Mw/Mn) > 0.03 \times FI/MFR - 3.0$$

with the proviso that when the value of 0.03×FI/MFR−3.0 is less than 0, it is taken as 0; and
to the above mentioned high-pressure radical polymerization low-density polyethylene [B1];
wherein a weight ratio ([A2]:[B1]) between said ethylene/α-olefin copolymer [A2] and said high-pressure radical polymerization low-density polyethylene [B1] is in the range of 99:1 to 60:40.

The ethylene copolymer composition is excellent in moldability. From this composition, a film having high transparency and high mechanical strength can be produced.

The fifth ethylene copolymer composition according to the present invention is characterized by comprising:
the above mentioned ethylene/α-olefin copolymer [A2] in an amount of 60 to 99% by weight, and
the above mentioned crystalline polyolefin [B2] in an amount of 1 to 40% by weight.

The ethylene copolymer composition is excellent in moldability. From this composition, a film having good balance between transparency and rigidity can be produced.

The sixth ethylene copolymer composition according to the present invention is characterized by comprising:
the above mentioned ethylene/α-olefin copolymer [A2] in an amount of 60 to 99% by weight, and
the above mentioned olefin type elastomer [B3] in an amount of 1 to 40% by weight;

a density ratio ([B3]/[A2]) of the density of said olefin type elastomer [B3] to the density of said ethylene/α-olefin copolymer [A2] being less than 1.

The ethylene copolymer composition is excellent in moldability. From this composition, a film having high mechanical strength can be produced.

The seventh ethylene copolymer composition according to the present invention is characterized by comprising:

[A3] an ethylene/α-olefin copolymer, which is obtained by copolymerizing ethylene with an α-olefin of 3 to 20 carbon atoms in the presence of a catalyst for olefin polymerization comprising (a) an organoaluminum oxy-compound and (b) a compound of Group IV transition metal of the periodic table containing a ligand having a cyclopentadienyl skeleton, and which has such properties that:
  (i) the density is in the range of 0.850 to 0.980 g/cm$^3$, and
  (ii) the melt flow rate (MFR) at 190° C. under a load of 2.16 kg is in the range of 0.01 to 200 g/10 min, and
[B4] a graft modified ethylene polymer or a graft modified ethylene copolymer;
  wherein a weight ratio ([A3]:[B4]) between said ethylene/α-olefin copolymer [A3] and said graft modified ethylene polymer or said graft modified ethylene copolymer [B4] is in the range of 99.5:0.5 to 60:40.

The ethylene copolymer composition is excellent in moldability. From this composition, a film having high transparency, high mechanical strength and good adhesion to highly polar materials can be produced.

The eighth ethylene copolymer composition according to the present invention is characterized by comprising:
(I) an ethylene/α-olefin copolymer composition [C1] comprising:
  [A4] an ethylene/α-olefin copolymer in an amount of 20 to 90% by weight, which is obtained by copolymerizing ethylene with an α-olefin of 3 to 20 carbon atoms in the presence of a catalyst for olefin polymerization comprising (a) an organoaluminum oxy-compound and (b) at least two kinds of compounds of Group IV transition metal of the periodic table containing a ligand having a cyclopentadienyl skeleton, and which has such properties that:
    (i) the density is in the range of 0.850 to 0.980 g/cm$^3$, and
    (ii) the intrinsic viscosity [η] as measured in decalin at 135° C. is in the range of 0.4 to 8 dl/g; and
  [A5] an ethylene/α-olefin copolymer in an amount of 10 to 80% by weight, which is different from the ethylene/α-olefin copolymer [A4] and is obtained by copolymerizing ethylene with an α-olefin of 3 to 20 carbon atoms in the presence of a catalyst for olefin polymerization comprising (a) an organoaluminum oxy-compound and (b') a compound of Group IV transition metal of the periodic table containing a ligand having a cyclopentadienyl skeleton, and which has such properties that:
    (i) the density is in the range of 0.850 to 0.980 g/cm$^3$, and
    (ii) the intrinsic viscosity [η] as measured in decalin at 135° C. is in the range of 0.4 to 8 dl/g; and
(II) the above mentioned high-pressure radical polymerization low-density polyethylene [B1];
  wherein a weight ratio ([C1]:[B1]) between said ethylene/α-olefin copolymer composition [C1] and said high-pressure radical polymerization low-density polyethylene [B1] is in the range of 99:1 to 60:40.

In the invention, the above-mentioned at least two kinds of compounds (b) of Group IV transition metals of the periodic table containing a ligand having a cyclopentadienyl skeleton are preferably at least one kind of a transition metal compound represented by the above formula [b-I] and at least one kind of a transition metal compound represented by the above formula [b-II].

The ninth ethylene copolymer composition according to the present invention is characterized by comprising:
(I) an ethylene/α-olefin copolymer composition [C2] comprising:
  [A6] an ethylene/α-olefin copolymer in an amount of 20 to 90% by weight, which is obtained by copolymerizing ethylene with an α-olefin of 3 to 20 carbon atoms having such properties that:
    (i) the density is in the range of 0.850 to 0.980 g/cm$^3$,
    (ii) the intrinsic viscosity [η] as measured in decalin at 135° C. is in the range of 0.4 to 8 dl/g,
    (iii) the melt tension (MT (g)) at 190° C. and the melt flow rate (MFR) satisfy the relation $$MT > 2.2 \times MFR^{-0.84},$$

(iv) the flow index (FI (1/sec)) defined by a shear rate which is given when a shear stress of molten copolymer at 190° C. reaches 2.4×10$^6$ dyne/cm$^2$ and the melt flow rate (MFR) satisfy the relation $$FI < 150 \times MFR,$$

(v) the molecular weight distribution (Mw/Mn) measured by GPC is in the range of 1.5 to 4, and
    (vi) MT/(Mw/Mn) and FI/MFR satisfy the relation $$MT/(Mw/Mn) > 0.03 \times FI/MFR - 3.0$$

with the proviso that when the value of 0.03×FI/MFR−3.0 is less than 0, it is taken as 0; and
    the above mentioned ethylene/α-olefin copolymer [A5] in an amount of 10 to 80% by weight, which is different from the ethylene/α-olefin copolymer [A6]; and
(II) the above mentioned high-pressure radical polymerization low-density polyethylene [B1];
  wherein a weight ratio ([C2]:[B1]) between said ethylene/α-olefin copolymer composition [C2] and said high-pressure radical polymerization low-density polyethylene [B1] is in the range of 99:1 to 60:40.

The eighth and ninth ethylene copolymer composition are excellent in heat resistance and moldability. From these compositions, films having high transparency and excellent anti-blocking resistance can be produced.

The tenth ethylene copolymer composition according to the present invention is characterized by comprising:
(I) an ethylene/α-olefin copolymer composition [C3] comprising:
  [A7] an ethylene/α-olefin copolymer in an amount of 20 to 90% by weight, which is obtained by copolymerizing ethylene with an α-olefin of 3 to 20 carbon atoms in the presence of a catalyst for olefin polymerization comprising (a) an organoaluminum oxy-compound and (b') a compound of Group IV transition metal of the periodic table containing a ligand having a cyclopentadienyl skeleton, and which has such properties that:
    (i) the density is in the range of 0.850 to 0.980 g/cm$^3$, and
    (ii) the intrinsic viscosity [η] as measured in decalin at 135° C. is in the range of 0.4 to 8 dl/g; and
  the above mentioned ethylene/α-olefin copolymer [A5] in an amount of 10 to 80% by weight, which is different from the ethylene/α-olefin copolymer [A7]; and (II) a graft modified ethylene polymer or a graft modified ethylene copolymer [B4];

wherein a weight ratio ([C3]:[B4]) between said ethylene/α-olefin copolymer composition [C3] and said graft modified ethylene polymer or said graft modified ethylene copolymer [B4] is in the range of 99.5:0.5 to 60:40.

The ethylene copolymer composition is excellent in moldability. From this composition, a film having high transparency, high mechanical strength and good adhesion to highly polar materials can be produced.

DETAILED DESCRIPTION OF THE INVENTION

Figure 1:
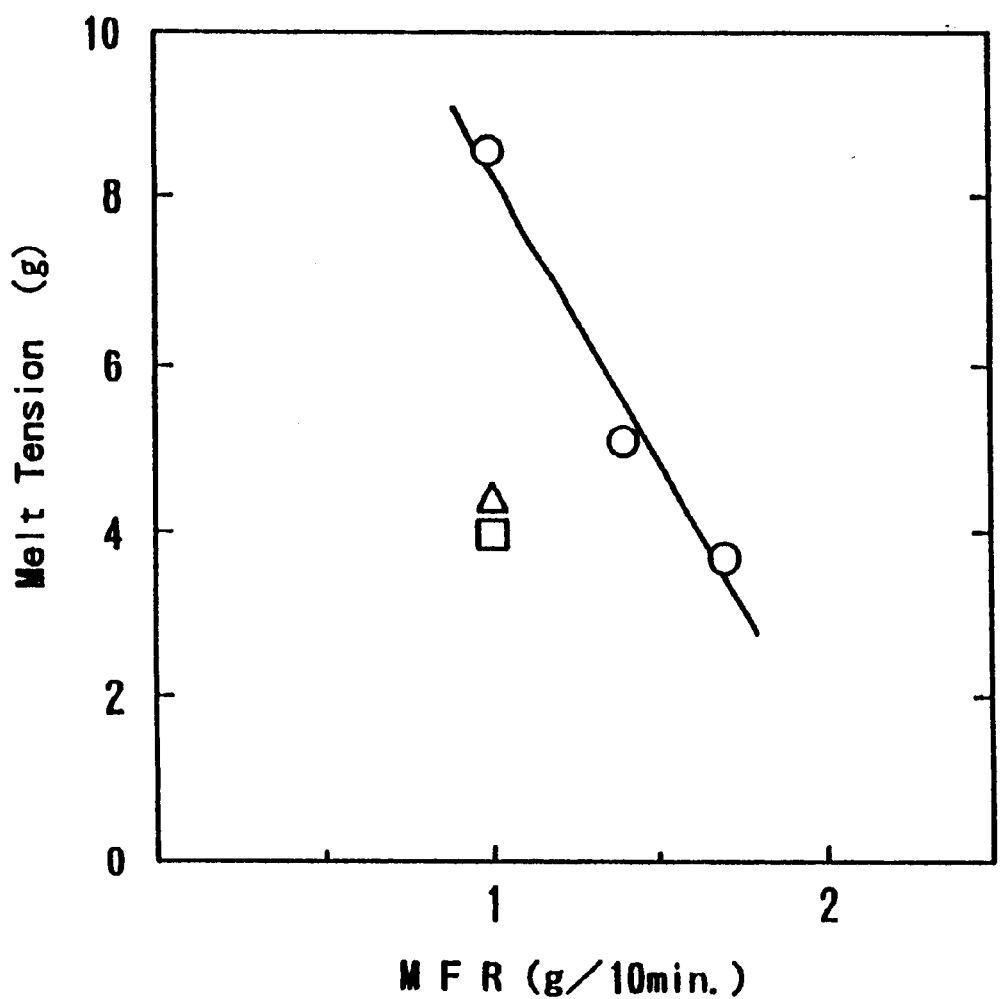
FIG. 1 is a diagram showing a relationship between a melt flow rate (MFR) and a melt tension (MT) of the ethylene/α-olefin copolymer composition according to the present invention and a relationship between MFR and MT of a conventionally known ethylene/α-olefin copolymer composition.

The ethylene copolymer composition according to the present invention, will be described in detail hereinafter.

The first ethylene copolymer composition according to the present invention is formed from an ethylene/α-olefin copolymer [A1] and a high-pressure radical polymerization low-density polyethylene [B1].

The second ethylene copolymer composition according to the present invention is formed from the ethylene/α-olefin copolymer [A1] and a crystalline polyolefin [B2].

The third ethylene copolymer composition according to the present invention is formed from the ethylene/α-olefin copolymer [A1] and an olefin type elastomer [B3].

The fourth ethylene copolymer composition according to the present invention is formed from an ethylene/α-olefin copolymer [A2] and the high-pressure radical polymerization low-density polyethylene [B1].

The fifth ethylene copolymer composition according to the present invention is formed from the ethylene/α-olefin copolymer [A2] and the crystalline polyolefin [B2].

The sixth ethylene copolymer composition according to the present invention is formed from the ethylene/α-olefin copolymer [A2] and the olefin type elastomer [B3].

The seventh ethylene copolymer composition according to the present invention is formed from an ethylene/α-olefin copolymer [A3] and a graft modified ethylene polymer or a graft modified ethylene copolymer [B4].

The eighth ethylene copolymer composition according to the present invention is formed from an ethylene/α-olefin copolymer composition [C1] comprising an ethylene/α-olefin copolymer [A4] and an ethylene/α-olefin copolymer [A5], and the high-pressure radical polymerization low-density polyethylene [B1].

The ninth ethylene copolymer composition according to the present invention is formed from an ethylene/α-olefin copolymer composition [C2] comprising an ethylene/α-olefin copolymer [A6] and the ethylene/α-olefin copolymer [A5], and the high-pressure radical polymerization low-density polyethylene [B1].

The tenth ethylene copolymer composition according to the present invention is formed from an ethylene/α-olefin copolymer composition [C3] comprising an ethylene/α-olefin copolymer [A7] and the ethylene/α-olefin copolymer [A5], and the graft modified ethylene polymer or the graft modified ethylene copolymer [B4].

First, the ethylene/α-olefin copolymers [A1] to [A7], the high-pressure radical polymerization low-density polyethylene [B1], the crystalline polyolefin [B2], the olefin type elastomer [B3] and the graft modified ethylene (co)polymer [B4], which form the ethylene copolymer compositions of the present invention are explained in detail hereinafter.

Ethylene/α-olefin Copolymer

The ethylene/α-olefin copolymers [A1] to [A7] which form the ethylene/α-olefin copolymer composition according to the invention are each a random copolymer of ethylene with an α-olefin of 3 to 20 carbon atoms. Examples of the α-olefin of 3 to 20 carbon atoms employable for the copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In each of the ethylene/α-olefin copolymers [A1] to [A7], it is desired that constituent units derived from ethylene are present in an amount of 50 to 100% by weight, preferably 55 to 99% by weight, more preferably 65 to 98% by weight, particularly preferably 70 to 96% by weight, and constituent units derived from an α-olefin of 3 to 20 carbon atoms are present in an amount of 0 to 50% by weight, preferably 1 to 45% by weight, more preferably 2 to 35% by weight, particularly preferably 4 to 30% by weight.

The composition of an ethylene/α-olefin copolymer is generally determined by $^{13}$C-NMR spectrum analysis of a sample prepared by homogeneously dissolving about 200 mg of the copolymer in 1 ml of hexachlorobutadiene in a sample tube having a diameter of 10 mm under the conditions of a measuring temperature of 120° C., a measuring frequency of 25.05 MHz, a spectrum width of 1,500 Hz, a pulse repetition period of 4.2 sec and a pulse width of 6 μsec.

The ethylene/α-olefin copolymer [A1] preferably has the following properties (i) to (iv), and particularly preferably has the following properties (i) to (ix).

The ethylene/α-olefin copolymer [A2] preferably has the following properties (i) to (vi), and particularly preferably has the following properties (i) to (ix).

The ethylene/α-olefin copolymer [A3] preferably has the following properties (i) and (ii), more preferably has the following properties (i) to (iv), and particularly preferably has the following properties (i) to (ix).

(i) The density (d) is in the range of usually 0.850 to 0.980 g/cm$^3$, preferably 0.880 to 0.960 g/cm$^3$, more preferably 0.890 to 0.935 g/cm$^3$, most preferably 0.905 to 0.930 g/cm$^3$.

The density (d) is determined by means of a density gradient tube using a strand, which has been obtained at the time of measurement of a melt flow rate (MFR) at 190° C. under a load of 2.16 kg and which is treated by heating at 120° C. for 1 hour and slowly cooling to room temperature over 1 hour.

(ii) The melt flow rate (MFR) is in the range of usually 0.01 to 200 g/10 min, preferably 0.05 to 50 g/10 min, more preferably 0.1 to 10 g/10 min.

The melt flow rate (MFR) is determined in accordance with ASTM D1238-65T under the conditions of a temperature of 190° C. and a load of 2.16 kg.

(iii) The melt tension (MT (g)) and the melt flow rate (MFR) satisfy the relation:

$$MT > 2.2 \times MFR^{-0.84},$$

preferably $8.0 \times MFR^{-0.84} > MT > 2.3 \times MFR^{-0.84}$, more preferably $7.5 \times MFR^{-0.84} > MT > 2.5 \times MFR^{-0.84}$, An ethylene/α-olefin copolymer having such properties shows good moldability because of high melt tension (MT).

The melt tension (MT (g)) is determined by measuring a stress given when a molten copolymer is stretched at a constant rate. That is, a powdery polymer was melted in a conventional manner, and the molten polymer was pelletized to give a measuring sample. Then, the MT of the sample was measured under the conditions of a resin temperature of 190° C., an extrusion rate of 15 mm/min and a take-up rate of 10 to 20 m/min using a MT measuring apparatus (produced by Toyo Seiki Seisakusho K.K.) having a nozzle diameter of 2.09 mmφ and a nozzle length of 8 mm. During the pelletization, to the ethylene/α-olefin copolymer were added 0.05% by weight of tri(2,4-di-t-butylphenyl) phosphate as a secondary antioxidant, 0.1% by weight of n-octadecyl-3-(4'-hydroxy-3',5'-di-t-butylphenyl)propionate as a heat stabilizer and 0.05% by weight of calcium stearate as a hydrochloric acid absorbent.

(iv) The flow index (FI (1/sec)) defined by a shear rate which is given when a shear stress of a molten copolymer at 190° C. reaches $2.4 \times 10^6$ dyne/cm$^2$ and the melt flow rate (MFR) satisfy the relation:

$$FI < 150 \times MFR,$$

preferably $FI < 140 \times MFR$, more preferably $FI < 130 \times MFR$.

The flow index (FI) is determined by extruding a resin from a capillary while changing a shear rate and measuring the shear rate given when the shear stress reaches the above-mentioned value. In this measurement, the same sample as described in the above-mentioned MT measurement is used, and the FI is measured under the conditions of a resin temperature of 190° C. and a shear stress of about $5 \times 10^4$ to $3 \times 10^6$ dyne/cm$^2$ using a capillary type flow property tester produced by Toyo Seiki Seisakusho K.K.

In the measurement, a diameter of the nozzle (capillary) is changed as follows depending on the MFR (g/10 min) of the resin to be measured:

in the case of MFR>20: 0.5 mm in the case of 20≧MFR>3: 1.0 mm in the case of 3≧MFR>0.8: 2.0 mm, and in the case of 0.8≧MFR: 3.0 mm.

(v) The molecular weight distribution (Mw/Mn, Mw: weight-average molecular weight, Mn: number-average molecular weight) measured by GPC is in the range of 1.5 to 4.

The molecular weight distribution (Mw/Mn) was measured in the following manner using a measuring device of GPC-150C produced by Millipore Co.

This measurement was carried out using a column of TSK-GNH-HT having a diameter of 72 mm and a length of 600 mm at a column temperature of 140° C. In this measurement, 500 microliters of a sample having a concentration of 0.1% by weight was introduced into the column in which o-dichlorobenzene (available from Wako Junyaku Kogyo K.K.) as a mobile phase was moved at a moving rate of 1.0 ml/min. In the mobile phase, 0.025% by weight of BHT (available from Takeda Chemical Industries, Ltd.) was contained as an antioxidant. A differential refractometer was used as a detector. With respect to the standard polystyrene of Mw<1,000 and Mw>$4 \times 10^6$, those available from Toso Co. were used, and with respect to the standard polystyrene of $1,000 < Mw < 4 \times 10^6$, those available from Pressure Chemical Co. were used.

(vi) MT/(Mw/Mn) and FI/MFR satisfy the relation:

$$MT/(Mw/Mn) > 0.03 \times FI/MFR - 3.0$$

with the proviso that when the value of $0.03 \times FI/MFR - 3.0$ is less than 0, it is taken as 0, preferably $$0.03 \times FI/MFR + 1.0 > MT/(Mw/Mn) > 0.03 \times FI/MFR - 2.8$$

with the proviso that when the value of $0.03 \times FI/MFR - 2.8$ is less than 0, it is taken as 0, more preferably $$0.03 \times FI/MFR + 0.8 > MT/(Mw/Mn) > 0.03 \times FI/MFR - 2.5$$

with the proviso that when the value of $0.03 \times FI/MFR - 2.5$ is less than 0, it is taken as 0.

With increase of the value of Mw/Mn, the value of MT becomes large, so that an index of MT/(Mw/Mn) is used in order to reduce an influence of the Mw/Mn value on the MT value. Likewise, with increase of the value of MFR, the value of FI becomes large, so that an index of FI/MFR is used in order to reduce an influence of the MFR value on the FI value.

(vii) The temperature (Tm (° C.)) at which the endothermic curve of the copolymer measured by a differential scanning calorimeter (DSC) shows the maximum peak and the density (d) satisfy the relation:

$$Tm < 400 \times d - 250,$$

preferably $Tm < 450 \times d - 297$, more preferably $Tm < 500 \times d - 344$, particularly preferably $Tm < 550 \times d - 391$.

The temperature (Tm (° C.)) at which the endothermic curve of an ethylene/α-olefin copolymer measured by a differential scanning calorimeter (DSC) shows the maximum peak is sought from an endothermic curve obtained by filling about 5 mg of a sample in an aluminum pan, heating to 200° C. at a rate of 10° C./min, holding the sample at 200° C. for 5 minutes, lowering the temperature to room temperature at a rate of 20° C./min and then heating at a rate of 10° C./min. This measurement is carried out using a DSC-7 type apparatus produced by Perkin Elmer Co.

(viii) The quantity fraction (W (% by weight)) of a n-decane-soluble component at room temperature (23° C.) and the density (d) satisfy the relation:

in the case of MFR≦10 g/10 min:

$$W < 80 \times \exp(-100(d-0.88)) + 0.1,$$

preferably $W < 60 \times \exp(-100(d-0.88)) + 0.1$, more preferably $W < 40 \times \exp(-100(d-0.88)) + 0.1$, and in the case of MFR>10 g/10 min:

$$W < 80 \times (MFR-9)^{0.26} \times \exp(-100(d-0.88)) + 0.1.$$

The measurement of the n-decane-soluble component quantity of an ethylene/α-olefin copolymer (polymer having a smaller soluble component quantity has a narrower composition distribution) is carried out by adding about 3 g of the copolymer to 450 ml of n-decane, dissolving the copolymer at 145° C., cooling the resultant solution to 23° C., removing a n-decane-insoluble portion by filtration, and recovering a n-decane-soluble portion from the filtrate.

It may be concluded that the ethylene/α-olefin copolymer which satisfies the above-mentioned relation between the temperature (Tm) at which the endothermic curve measured by a differential scanning calorimeter (DSC) shows the maximum peak and the density (d), and the relation between the quantity fraction (W) of the n-decane-soluble component and the density (d), has a narrow composition distribution.

(ix) The number of unsaturated bonds existing in the molecule is not more than 0.5 per 1,000 carbon atoms and is less than 1 per 1 molecule of the polymer.

The determination of the unsaturated bonds is made by means of $^{13}$C-NMR spectrum analysis. In detail, an area intensity of signals given by a carbon atom forming a bond other than a double bond, namely, an area intensity of signals in the range of 10 to 50 ppm, and an area intensity of signals given by a carbon atom forming a double bond, namely, an area intensity of signals in the range of 105 to 150 ppm, are sought from the integral curve, and from the ratio therebetween, the number of the unsaturated bonds is determined.

The above mentioned ethylene/α-olefin copolymers [A1] and [A2] can be prepared by copolymerizing ethylene with an α-olefin of 3 to 20 carbon atoms in the presence of a catalyst for olefin polymerization comprising, for example, the organoaluminum oxy-compound (a) and at least two kinds of the compounds (b) of Group IVB transition metal of the periodic table containing a ligand having a cyclopentadienyl skeleton, in such a manner that the resultant copolymer has a density of 0.850 to 0.980 g/cm$^3$. The above mentioned ethylene/α-olefin copolymers can be produced in high polymerization activity by copolymerizing ethylene with an α-olefin of 3 to 20 carbon atoms in the presence of a catalyst for olefin polymerization comprising the organoaluminum oxy-compound (a) and at least two kinds of the compounds (b) of transition metal and a carrier, and if necessary, (c) an organoaluminum compound, all components being described later.

The above mentioned ethylene/α-olefin copolymer [A3] can be prepared by copolymerizing ethylene with an α-olefin of 3 to 20 carbon atoms in the presence of a catalyst for olefin polymerization comprising the organoaluminum oxy-compound (a) and the compound (b) of Group IVB transition metal of the periodic table containing a ligand having a cyclopentadienyl skeleton, in such a manner that the resultant copolymer has a density of 0.850 to 0.980 g/cm$^3$. The above mentioned ethylene/α-olefin copolymer can be produced in high polymerization activity by copolymerizing ethylene with an α-olefin of 3 to 20 carbon atoms in the presence of a catalyst for olefin polymerization comprising the organoaluminum oxy-compound (a) and the compound (b) of Group IVB transition metal of the periodic table containing a ligand having a cyclopentadienyl skeleton and a carrier, and if necessary, (c) an organoaluminum compound, preferably in the presence of a catalyst for olefin polymerization comprising the organoaluminum oxy-compound (a) and at least two kinds of the compounds (b) of transition metal and a carrier, and if necessary, (c) an organoaluminum compound, all components being described later.

The ethylene/α-olefin copolymer [A4] desirably has the density (d) of 0.850 to 0.980 g/cm$^3$, preferably 0.880 to 0.940 g/cm$^3$, more preferably 0.890 to 0.935 g/cm$^3$, most preferably 0.900 to 0.930 g/cm$^3$, and the intrinsic viscosity [η] as measured in decalin at 135° C. of 0.4 to 8 dl/g, preferably 1.25 to 8 dl/g, more preferably 1.27 to 6 dl/g. Further, the ethylene/α-olefin copolymer [A4] preferably has the density (d) and the intrinsic viscosity [η] both within the above described ranges, and has the above mentioned properties (iii) to (vi), more preferably as the density (d) and the intrinsic viscosity [η] both within the above described ranges, and has the above mentioned properties (iii) to (viii).

The above mentioned ethylene/α-olefin copolymer [A4] can be prepared by copolymerizing ethylene with an α-olefin of 3 to 20 carbon atoms in the presence of a catalyst for olefin polymerization comprising the organoaluminum oxy-compound (a) and at least two kinds of the compounds (b) of Group IVB transition metal of the periodic table containing a ligand having a cyclopentadienyl skeleton, in such a manner that the resultant copolymer has a density of 0.850 to 0.980 g/cm$^3$. The above mentioned ethylene/α-olefin copolymer can be produced in high polymerization activity by copolymerizing ethylene with an α-olefin of 3 to 20 carbon atoms in the presence of a catalyst for olefin polymerization comprising the organoaluminum oxy-compound (a) and at least two kinds of the compounds (b) of transition metal and a carrier, and if necessary, (c) an organoaluminum compound, all components being described later.

The ethylene/α-olefin copolymer [A5] desirably has the density (d) of 0.850 to 0.980 g/cm$^3$, preferably 0.910 to 0.960 g/cm$^3$, more preferably 0.915 to 0.955 g/cm$^3$, particularly preferably 0.920 to 0.950 g/cm$^3$, and the intrinsic viscosity [η] as measured in decalin at 135° C. of 0.4 to 8 dl/g, preferably 0.4 to 1.25 dl/g, more preferably 0.5 to 1.23 dl/g. Further, the ethylene/α-olefin copolymer [A5] preferably has the density (d) and the intrinsic viscosity [η] both within the above described ranges, and has the above mentioned properties (vii) and (viii).

The above mentioned ethylene/α-olefin copolymer [A5] can be prepared by copolymerizing ethylene with an α-olefin of 3 to 20 carbon atoms in the presence of a catalyst for olefin polymerization comprising the organoaluminum oxy-compound (a) and the compound (b') of transition metal and a carrier, and if necessary, (c) an organoaluminum compound, all components being described later, in such a manner that the resultant copolymer has a density of 0.850 to 0.980 g/cm$^3$.

The ethylene/α-olefin copolymer [A6] desirably has the density (d) of 0.850 to 0.980 g/cm$^3$, preferably 0.880 to 0.940 g/cm$^3$, more preferably 0.890 to 0.935 g/cm$^3$, most preferably 0.900 to 0.930 g/cm$^3$, and the intrinsic viscosity [η] as measured in decalin at 135° C. of 0.4 to 8 dl/g, preferably 0.4 to 1.25 dl/g, more preferably 0.5 to 1.23 dl/g. Further, the ethylene/α-olefin copolymer [A6] preferably has the density (d) and the intrinsic viscosity [η] both within the above described ranges, and has the above mentioned properties (iii) to (viii).

The above mentioned ethylene/α-olefin copolymer [A6] can be prepared by copolymerizing ethylene with an α-olefin of 3 to 20 carbon atoms in the presence of a catalyst for olefin polymerization comprising the organoaluminum oxy-compound (a) and at least two kinds of the compounds (b) of transition metal and a carrier, and if necessary, (c) an organoaluminum compound, all components being described later, in such a manner that the resultant copolymer has a density of 0.850 to 0.980 g/cm$^3$.

The ethylene/α-olefin copolymer [A7] desirably has the density (d) of 0.850 to 0.980 g/cm$^3$, preferably 0.880 to 0.940 g/cm$^3$, more preferably 0.890 to 0.935 g/cm$^3$, most preferably 0.900 to 0.930 g/cm$^3$, and the intrinsic viscosity [η] as measured in decalin at 135° C. of 0.4 to 8 dl/g, preferably 1.25 to 8 dl/g, more preferably 1.27 to 6 dl/g. Further, the ethylene/α-olefin copolymer [A7] preferably has the density (d) and the intrinsic viscosity [η] both within the above described ranges, and has the above mentioned properties (iii) to (iv), more preferably has the density (d) and the intrinsic viscosity [η] both within the above described ranges, and has the above mentioned properties (iii) to (viii).

The above mentioned ethylene/α-olefin copolymer [A7] can be prepared by copolymerizing ethylene with an α-olefin of 3 to 20 carbon atoms in the presence of a catalyst for olefin polymerization comprising the organoaluminum oxy-compound (a) and the compound (b') of transition metal and a carrier, and if necessary, (c) an organoaluminum compound, all components being described later, preferably in the presence of a catalyst for olefin polymerization comprising the organoaluminum oxy-compound (a) and at least two kinds of the compounds (b) of transition metal and a carrier, and if necessary, (c) an organoaluminum compound, all components being described later, in such a manner that the resultant copolymer has a density of 0.850 to 0.980 g/cm³.

Each catalyst component used in the catalyst for olefin polymerization employed in the preparation of the ethylene/α-olefin copolymers [A1] to [A7] is explained below.

First, the organoaluminum oxy-compound (a) is explained.

The organoaluminum oxy-compound (a) [hereinafter sometimes referred to as "component (a)"] may be a known benzene-soluble aluminoxane or the benzene-insoluble organoaluminum oxy-compound having been disclosed in Japanese Patent L-O-P No. 276807/1990.

The above-mentioned aluminoxane may be prepared, for example, by the following procedures:

(1) a procedure for recovering an aluminoxane as its hydrocarbon solution which comprises adding an organoaluminum compound such as trialkylaluminum to a suspension in a hydrocarbon medium of a compound containing adsorbed water, or a salt containing water of crystallization such as magnesium chloride hydrate, copper sulfate hydrate, aluminum sulfate hydrate, nickel sulfate hydrate and cerium chloride hydrate, and reacting the organoaluminum compound;

(2) a procedure for recovering an aluminoxane as its hydrocarbon solution which comprises reacting water, ice or steam directly with an organoaluminum compound such as trialkylaluminum in a solvent such as benzene, toluene, ethyl ether and tetrahydrofuran; and (3) a procedure for recovering an aluminoxane which comprises reacting an organotinoxide such as dimethyltinoxide and dibutyltinoxide with an organoaluminum compound such as trialkylaluminum in a solvent such as decane, benzene or toluene.

Moreover, the aluminoxane may contain a small amount of an organometal component. Furthermore, the solvent or unreacted organoaluminum compound may be removed from the above-mentioned recovered aluminoxane-containing solution, by distillation, and the aluminoxane may be redissolved in a solvent.

Concrete examples of the organoaluminum compound used for the preparation of the aluminoxane include trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;
tricycloalkylaluminums such as tricyclohexylaluminum and tricyclooctylaluminum;
dialkylaluminum halides such as dimethylaluminum chloride, diethylaluminum chloride, diethylaluminum bromide and diisobutylaluminum chloride;
dialkylaluminum hydrides such as diethylaluminum hydride and diisobutylaluminum hydride;
dialkylaluminum alkoxides such as dimethylaluminum methoxide and diethylaluminum ethoxide; and
dialkylaluminum aryloxides such as diethylaluminum phenoxide.

Of these compounds, trialkylaluminum and tricycloalkylaluminum are particularly preferable.

Furthermore, there may also be used as the organoaluminum compound isoprenylaluminum represented by the general formula $$(i\text{-}C_4H_9)_x Al_y (C_5H_{10})_z$$

wherein x, y and z are each a positive number, and $z \geq 2x$.

The organoaluminum compounds mentioned above may be used either singly or in combination.

Solvents used for the solutions of the aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; and halogenated compounds derived from the above-mentioned aromatic hydrocarbons, aliphatic hydrocarbons and alicyclic hydrocarbons, especially chlorinated and brominated hydrocarbons.

In addition, there may also be used ethers such as ethyl ether and tetrahydrofuran. Of these solvents as exemplified above, aromatic hydrocarbons are particularly preferred.

The benzene-insoluble organoaluminum oxy-compounds used as component (a) contain an Al component soluble in benzene at 60° C. in an amount of not greater than 10%, preferably not greater than 5%, particularly preferably not greater than 2% in terms of Al atom, and they are insoluble or sparingly soluble in benzene.

Solubility in benzene of such organoaluminum oxy-compounds as mentioned above is obtained by suspending in 100 ml of benzene the organoaluminum oxy-compound in an amount corresponding to 100 mg atoms in terms of Al, mixing the resulting suspension at 60° C. for 6 hours with stirring, filtering the resulting mixture with a G-5 glass filter equipped with a jacket kept at 60° C., washing 4 times the solid portion separated on the filter with 50 ml of benzene at 60° C., and measuring the amount (x mmole) of Al atoms present in the whole filtrate.

The transition metal compound catalyst component (b) [hereinafter sometimes referred to as "component (b)"] is a compound of a transition metal in Group IVB of the periodic table which has a ligand having a cyclopentadienyl skeleton. Concretely, the component (b) is a transition metal compound represented by the following formula [b-I] or [b-II].

$$ML^1_x \qquad\qquad [\text{b-I}]$$

In the formula [b-I], M is a transition metal atom selected from Group IVB of the periodic table, $L^1$ is a ligand coordinating to the transition metal atom, at least two of $L^1$ are substituted from a cyclopentadienyl group, a methylcyclopentadienyl group, an ethylcyclopentadienyl group and a substituted cyclopentadienyl group having at least one substituent group selected from a hydrocarbon group of 3 to 10 carbon atoms, $L^1$ other than the (substituted) cyclopentadienyl group is a hydrocarbon group of 1 to 12 carbon atoms, an alkoxy group, an aryloxy group, a trialkylsilyl group, a halogen atom or a hydrogen atom. X is a valence of the transition metal atom M.

$$ML^2_x \qquad [b\text{-}II]$$

In the formula [b-II], M is a transition metal atom selected from Group IVB of the periodic table, $L^2$ is a ligand coordinating to the transition metal atom, at least two of $L^2$ are substituted cyclopentadienyl groups having 2–5 substituent groups selected from a methyl group and an ethyl group, and $L^2$ other than the substituted cyclopentadienyl group is a hydrocarbon group of 1 to 12 carbon atoms, an alkoxy group, an aryloxy group, a trialkylsilyl group, a halogen atom or a hydrogen atom. X is a valence of the transition metal atom M.

The transition metal compounds represented by the above formula [b-I] or [b-II] are explained below in detail.

In the above formula [b-I], M is a transition metal atom selected from Group IVB of the periodic table, and it is concretely zirconium, titanium or hafnium, preferably zirconium.

$L^1$ is a ligand coordinating to the transition metal atom M, and at least two of $L^1$ are groups selected from a cyclopentadienyl group, a methylcyclopentadienyl group, an ethylcyclopentadienyl group and a substituted cyclopentadienyl group having at least one substituent group selected from a hydrocarbon group of 3 to 10 carbon atoms. Each of ligand may be the same or different. $L^1$ other than the cyclopentadienyl group or the substituted cyclopentadienyl group is a hydrocarbon group of 1 to 12 carbon atoms, an alkoxy group, an aryloxy group, a trialkylsilyl group, a halogen atom or a hydrogen atom.

The substituted cyclopentadienyl group may have two or more of substituents. Each of substituent may be the same or different. When the substituted cyclopentadienyl has two or more of substituents, at least one substituent is a hydrocarbon group of 3 to 10 carbon atoms, and the other substituents are selected from a methyl group, an ethyl group and the hydrocarbon group of 3 to 10 carbon atoms.

Examples of the hydrocarbon group of 3 to 10 carbon atoms include alkyl group, cycloalkyl group, aryl group and aralkyl group. Concrete examples thereof include alkyl group such as n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group. Of these, preferred are alkyl groups, and particularly preferred are n-propyl group and n-butyl group.

In the present invention, the (substituted) cyclopentadienyl group coordinated to the transition metal is preferably the substituted cyclopentadienyl group, more preferably the cyclopentadienyl group substituted with alkyl group having 3 or more of carbon atoms, further preferably the substituted cyclopentadienyl group having two substituents, and particularly the 1,3-substituted cyclopentadienyl group.

In the above-mentioned formula [b-I], ligand $L^1$ other than the cyclopentadienyl group or the substituted cyclopentadienyl group is a hydrocarbon group of 1 to 12 carbon atoms, an alkoxy group, an aryloxy group, a trialkylsilyl group, a halogen atom or a hydrogen atom.

Examples of the hydrocarbon group of 1 to 12 carbon atoms include alkyl group, cycloalkyl group, aryl group and aralkyl group. Concrete examples thereof include alkyl group such as methyl group, ethyl group, n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group.

Examples of the alkoxy group include methoxy group, ethoxy group, n-propoxy group, isopropoxy group, n-butoxy group, isobutoxy group, sec-butoxy group, t-butoxy group, pentoxy group, hexoxy group and octoxy group.

Examples of the aryloxy group include phenoxy group and the like.

Examples of the trialkylsilyl group include trimethylsilyl group, triethylsilyl group and triphenylsilyl group.

Examples of the halogen atom include fluorine, chlorine, bromine and iodine.

Listed below are examples of the transition metal compound represented by the formula [b-I].

Bis(cyclopentadienyl)zirconium dichloride,
Bis(methylcyclopentadienyl)zirconium dichloride,
Bis(ethylcyclopentadienyl)zirconium dichloride,
Bis(n-propylcyclopentadienyl)zirconium dichloride,
Bis(n-butylcyclopentadienyl)zirconium dichloride,
Bis(n-hexylcyclopentadienyl)zirconium dichloride,
Bis(methyl-n-propylcyclopentadienyl)zirconium dichloride,
Bis(methyl-n-butylcyclopentadienyl)zirconium dichloride,
Bis(dimethyl-n-butylcyclopentadienyl)zirconium dichloride,
Bis(n-butylcyclopentadienyl)zirconium dibromide,
Bis(n-butylcyclopentadienyl)zirconium methoxychloride,
Bis(n-butylcyclopentadienyl)zirconium ethoxychloride,
Bis(n-butylcyclopentadienyl)zirconium butoxychloride,
Bis(n-butylcyclopentadienyl)zirconium diethoxide,
Bis(n-butylcyclopentadienyl)zirconium methylchloride
Bis(n-butylcyclopentadienyl)zirconium dimethyl,
Bis(n-butylcyclopentadienyl)zirconium benzylchloride,
Bis(n-butylcyclopentadienyl)zirconium dibenzyl,
Bis(n-butylcyclopentadienyl)zirconium phenylchloride, and
Bis(n-butylcyclopentadienyl)zirconium hydride chloride.

In the above exemplified compounds, di-substituted cyclopentadienyl include 1,2- and 1,3-substituted, and tri-substituted include 1,2,3- and 1,2,4-substituted. Also employable in the invention are transition metal compounds obtained by substituting titanium metal or hafnium metal for the zirconium metal in the above-exemplified zirconium compounds.

Of the above-exemplified transition metal compounds represented by the formula [b-I], particularly preferred are Bis(n-propylcyclopentadienyl)zirconium dichloride, Bis(n-butylcyclopentadienyl)zirconium dichloride, Bis(1-methyl-3-n-propylcyclopentadienyl)zirconium dichloride and Bis(1-methyl-3-n-butylcyclopentadienyl)zirconium dichloride.

In the above-mentioned formula [b-II], M is a transition metal selected from Group IVB of the periodic table, and concrete preferable examples of M include zirconium, titanium and hafnium. Of these, particularly preferred is zirconium.

$L^2$ is a ligand coordinated to the transition metal, and at least two of them are substituted cyclopentadienyl groups having 2–5 of substituents selected from a methyl group and an ethyl group. Each of ligand may be the same or different. The substituted cyclopentadienyl groups are the substituted cyclopentadienyl groups having 2 or more of substituents, preferably the substituted cyclopentadienyl groups having 2 or 3 of substituents, more preferably the substituted cyclopentadienyl groups having two substituents, particularly the 1,3-substituted cyclopentadienyl groups. Each of substituent may be the same or different.

In the above-mentioned formula [b-II], ligand $L^2$ other than the substituted cyclopentadienyl group is a hydrocarbon group of 1 to 12 carbon atoms, an alkoxy group, an aryloxy group, a trialkylsilyl group, a halogen atom or a hydrogen atom as similar to the ligand $L^1$ in the above-mentioned formula [b-I].

The transition metal compound represented by the general formula [b-II] include, for example, Bis(dimethylcyclopentadienyl)zirconium dichloride,
Bis(diethylcyclopentadienyl)zirconium dichloride,
Bis(methylethylcyclopentadienyl)zirconium dichloride,
Bis(dimethylethylcyclopentatienyl)zirconium
Bis(dimethylethylcyclopentatienyl)zirconium dichloride,
Bis(dimethylethylcyclopentatienyl)zirconium
Bis(dimethylcyclopentadienyl)zirconium dibromide,
Bis(dimethylcyclopentadienyl)zirconium methoxychloride,
Bis(dimethylcyclopentadienyl)zirconium ethoxychloride,
Bis(dimethylcyclopentadienyl)zirconium butoxychloride,
Bis(dimethylcyclopentadienyl)zirconium diethoxide,
Bis(dimethylcyclopentadienyl)zirconium methylchloride,
Bis(dimethylcyclopentadienyl)zirconium dimethyl,
Bis(dimethylcyclopentadienyl)zirconium benzylchloride,
Bis(dimethylcyclopentadienyl)zirconium dibenzyl,
Bis(dimethylcyclopentadienyl)zirconium phenylchloride, and Bis(dimethylcyclopentadienyl)zirconium hydride chloride.

In the above exemplified compounds, di-substituted cyclopentadienyl include 1,2- and 1,3-substituted, and tri-substituted include 1,2,3- and 1,2,4-substituted.

There may also be used transition metal compounds obtained by substituting titanium or hafnium for zirconium in the above-exemplified zirconium compounds.

In the above-mentioned transition metal compounds represented by the general formula [b-II], particularly referred is Bis(1,3-dimethylcyclopentadienyl)zirconium dichloride,
Bis(1,3-diethylcyclopentadienyl)zirconium dichloride, or
Bis(1-methyl-3-ethylcyclopentadienyl)zirconium dichloride.

In the invention, it is preferred to use a combination of at least one kind of a transition metal compound represented by the above formula [b-I] and at least one kind of a transition metal compound represented by the above formula [b-II] as the transition metal compound (b). In concrete, preferably used are a combination of bis(1,3-n-butylmethylcyclopentadienyl)zirconium dichloride and bis (1,3-dimethylcyclopentadienyl)zirconium dichloride, a combination of bis(1,3-n-propylmethylcyclopentadienyl) zirconium dichloride and bis(1,3-dimethylcyclopentadienyl) zirconium dichloride, and a combination of bis(n-butylcyclopentadienyl)zirconium dichloride and bis(1,3-dimethylcyclopentadienyl)zirconium dichloride.

The above-mentioned at least one kind of a transition metal compound (b-I) represented by the formula [b-I] and at least one kind of a transition metal compound (b-II) represented by the formula [b-II] are desirably used in such amounts that the molar ratio [(b-I)/(b-II)] is in the range of 99/1 to 50/50, preferably 97/3 to 70/30, more preferably 95/5 to 75/25, most preferably 90/10 to 80/20.

A transition metal compound catalyst component containing at least one kind of a transition metal compound (b-I) represented by the formula [b-I] and at least one kind of a transition metal compound (b-II) represented by the formula [b-II] is sometimes referred to as "component (b)" hereinafter.

The compound (b') (hereinafter called "component (b')" in some cases) of the IVB group transition metal of the periodic table which contains a ligand having a cyclopentadienyl skeleton used in the preparation the ethylene/α-olefin copolymer [B1] in the invention is no way limited as far as it is a compound of a transition metal in Group IV of the periodic table which contains a ligand having a cyclopentadienyl skeleton. However, the component (b') is preferably a transition compound represented by the following formula [b-III].

$$ML_x \quad [\text{b-III}]$$

wherein M is a transition metal atom selected from Group IVB of the periodic table, L is a ligand coordinating to the transition metal, at least one of L is a ligand having a cyclopentadienyl skeleton, and L other than the ligand having a cyclopentadienyl skeleton is a hydrocarbon group of 1–12 carbon atoms, an alkoxy group, an aryloxy group, an aryloxy group, a trialkylsilyl group, $SO_3R$ group (provided that R is a hydrocarbon group which may have such a substituent as halogen), halogen atom or hydrogen atom, and x is a valence of the transition metal atom.

The transition metal compound represented by the above formula [b-III] include the transition metal compound (b-I) represented by the above formula [b-I] and the transition metal compound (b-II) represented by the above formula [b-II].

In the above-mentioned formula [b-III], M is a transition metal selected from Group IVB of the periodic table, and concrete preferable examples of M include zirconium, titanium and hafnium. Of these, particularly preferred is zirconium.

The ligands having a cyclopentadienyl skeleton are, for example, cyclopentadienyl group, alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylpentadienyl, or indenyl group, 4,5,6,7-tetrahydroindenyl group and fluorenyl group. These groups as exemplified above may be substituted with a halogen atom or trialkylsilyl group.

Of the ligands coordinating with the transition metal atom, particularly preferred is an alkyl-substituted cyclopentadienyl group.

When the compound represented by the general formula [b-III] contains 2 or more ligands each having a cyclopentadienyl skeleton, the two ligands out of those having a cyclopentadienyl skeleton may be linked together through an alkylene group such as ethylene or propylene, a substituted alkylene group such as isopropylidene or diphenylmethylene, a silylene group or a substituted silylene group such as dimethylsilylene, diphenylsilylene or methylphenylsilylene.

The ligands L other than those having a cyclopentadienyl skeleton may include those mentioned below.

The hydrocarbon group of 1–12 carbon atoms includes such group as alkyl, cycloalkyl, aryl or aralkyl, and more particularly, the alkyl group includes methyl, ethyl, propyl, isopropyl or butyl; the cycloalkyl group includes cyclopentlyl or cyclohexyl; the aryl group includes phenyl or tolyl; and the aralkyl group includes benzyl or neophyl.

Further, the alkoxy group includes methoxy, ethoxy or butoxy; aryloxy group includes phenoxy; the halogen includes fluorine, chlorine, bromine or iodine; and the ligand represented by $SO_3R$ includes p-toluenesulfonate, methanesulfonate or trifluoromethanesulfonate.

When the valence of the transition metal atom is, for example, 4, the transition metal compound (b') containing ligands having a cyclopentadienyl skeleton is represented by the following formula [b-III'] in more detail.

$$R^2_k R^3_l R^4_m R^5_n M \quad\quad [b\text{-}III']$$

wherein M represents the same transition metal atom as in the formula [b-III], $R^2$ represents a group (ligand) having cyclopentadienyl skeleton, $R^3$, $R^4$ and $R^5$ each represent a group having a cyclopentadienyl skeleton, alkyl group, cycloalkyl group, aryl group, aralkyl group, alkoxyl group, aryloxy group, trialkylsilyl group, $SO_3R$ group, halogen atom or hydrogen atom, k is an integer of 1 or more, and k+l+m+n=4.

In the present invention, there is used preferably a metallocene compound having the above-mentioned formula [b-III'] in which at least two of $R^2$, $R^3$, $R^4$ and $R^5$ are the groups (ligands) having a cyclopentadienyl skeleton, for example, $R^2$ and $R^3$ are the groups (ligands) having a cyclopentadienyl.

The groups having a cyclopentadienyl skeleton mentioned above may be linked together through an alkylene group such as ethylene or propylene, a substituted alkylene group such as isopropylene or diphenylmethylene, a silylene group or a substituted silylene group such as dimethylsilylene, diphenylsilylene or methylphenylsilylene.

Further, $R^4$ and $R^5$ in the above-mentioned formula [b-III'] are each a group having a cyclopentadienyl skeleton, alkyl group, cycloalkyl group, aryl group, arlakyl group, alkoxyl group, aryloxy group, trialkylsilyl group, $SO_3R$ group, halogen atom or hydrogen atom.

Exemplified below are the transition metal compounds (b') of the formula [b-III'] wherein M is zirconium.

Bis(indenyl)zirconium dichloride,
Bis(indenyl)zirconium dibromide,
Bis(indenyul)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethylzirconium,
Ethylenebis(indenyl)diphenylzirconium,
Ethylenebis(indenyl)methylzirconium monochloride,
Ethylenebis(indenyl)zirconium bis(methanesulfonate),
Ethylenebis(indenyl)zirconium bis(p-toluenesulfonate),
Ethylenebis(indenyl)zirconium bis(trifluoromethanesulfonate),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl) zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dsichloride,
Dimethylsilylenebis(trimethylcyclopentadienyl) zirconium dichloride,
Dimethylsilylenebis(indenyl)zirconium dichloride,
Dimethylsilylenebis(indenyl)zirconium bis(trifluoromethane-sulfonate),
Dimethylsilylenebis(4,5,6,7-tetrahydroindenyl)zirconium dichloride,
Dimethylsilylene(cyclopentadienyl-fluorenyl)zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(cyclopentadienyl)zirconium monochloride monohydride,
Bis(cyclopentadienyl)methylzirconium monohydride,
Bis(cyclopentadienyl)dimethylzirconium,
Bis(cyclopentadienyl)diphenylzirconium,
Bis(cyclopentadienyl)dibenzylzirconium,
Bis(cyclopentadienyl)zirconium methoxychloride,
Bis(cyclopentadienyl)zirconium ethoxychloride,
Bis(cyclopentadienyl)zirconium bis(methanesulfonate),
Bis(cyclopentadienyl)zirconium bis(p-toluenesulfonate),
Bis(cyclopentadienyl)zirconium bis(trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxychloride,
Bis(dimethylcyclopentadienyl)zirconium bis(trifluoromethanesulfonate),
Bis(ethylcylopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcylcopentadienyl)zirconium dichloride,
Bis(methylbutylcyclopentadienyl)zirconium dichloride,
Bis(methylbutylcyclopentadienyl)zirconium bis(methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride, and
Bis(trimethylsilylcyclopentadienyl)zirconium dichloride.

In the compounds exemplified above, the di-substituted cyclopentadienyl ring includes 1,2- and 1,3-substituted compounds, and the tri-substituted cyclopentadienyl ring includes 1,2,3- and 1,2,4-substituted compounds. Further, the alkyl group such as propyl or butyl includes isomer such as n-, i-, sec-, tert-compounds, In the present invention, the above-exemplified zirconium compounds in which the zirconium has been replaced by titanium or hafnium can also be used as the transition metal compounds.

The carrier used in present invention is a solid inorganic or organic compound in granules or fine particles having a particle size of 10 to 300 μm, preferably 20 to 200 μm. Of these carriers, porous oxides are preferable as inorganic carriers. Concrete examples of the oxide carriers include $SiO_2$, $Al_2O_3$, $MgO$, $ZrO_2$, $TiO_2$, $B_2O_3$, $CaO$, $ZnO$, $BaO$, $ThO_2$, or a mixture of these compounds such as $SiO_2$—$MgO$, $SiO_2$—$Al_2O_3$, $SiO_2$—$TiO_2$, $SiO_2$—$V_2O_5$, $SiO_2$—

$Cr_2O_3$ and $SiO_2$—$TiO_2$—$MgO$. Of these carriers, preferred are those comprising at least one compound selected from the group consisting of $SiO_2$ and $Al_2O_3$ as a major component.

Furthermore, the above-mentioned inorganic oxide or oxides may also contain a small amount of a carbonate, a sulfate, a nitrate and an oxide such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $LiO_2$.

Though the carriers have different properties among them depending on the types and preparation methods thereof, the carriers preferably used in the invention have a specific surface area of 50 to 1000 m²/g, preferably 100 to 700 m²/g, a pore volume of desirably 0.3 to 2.5 cm²/g. The carriers are prepared if necessary by firing at a temperature of 100 to 1000° C., preferably 150 to 700° C.

It is also desirable that this carrier has an amount of adsorbed water of less than 1.0% by weight, preferably less than 0.5% by weight, and a surface hydroxyl group in an amount of 1.0% by weight or more, preferably 1.5–4.0% by weight and especially 2.0–3.5% by weight.

The amount of adsorbed water (% by weight) and that of the surface hydroxyl group (% by weight) are obtained by the following procedures.

(Amount of adsorbed water)

The specimen is dried at a temperature of 200° C., an ordinary pressure and in a nitrogen stream for 4 hours to measure a weight loss which is then taken as the amount of adsorbed water.

(Surface hydroxyl group)

The weight measured by drying the carrier at a temperature of 200° C., an ordinary pressure in a nitrogen stream for 4 hours is taken as X (g), and the carrier as dried is then calcined at a temperature of 1,000° C. for 20 hours to obtain a calcined product from which the surface hydroxyl groups have disappeared, and the weight of the calcination product as measured is taken as Y (g). The amount of the surface hydroxyl groups is calculated on the basis of the following equation.

Surface hydroxyl group (wt %)=[(X−Y)/X]×100

Moreover, there can be mentioned organic compounds in solid granules or fine solid particles each having a particle size of 10 to 300 μm as carriers which can be used as the carrier in the present invention. Examples of these organic compounds include (co)polymers containing as the main component constituent units derived from an α-olefin of 2 to 14 carbon atoms, such as ethylene, propylene, 1-butene and 4-methyl-1-pentene, or polymers or copolymers containing as the main component constituent units derived from vinylcyclohexane or styrene.

Though the catalyst used in the present invention is formed from the organoaluminum oxy-compound (a), at least two kinds of the transition metal compounds (b) and the carrier, or is formed from the organoaluminum oxy-compound (a), the transition metal compound (b') and the carrier, each catalyst may, if necessary, contain an organoaluminum compound (c).

Examples of the organoaluminum compound (c) [hereinafter sometimes referred to as "component (c)"] include an organoaluminum compound represented by the following formula [IV]

$$R^1_nAlX_{3-n} \quad [IV]$$

wherein $R^1$ is a hydrocarbon group of 1 to 12 carbon atoms, X is a halogen atom or a hydrogen atom, and n is 1 to 3.

In the above formula [IV], $R^1$ is a hydrocarbon group of 1 to 12 carbon atoms, for example, an alkyl group, a cycloalkyl group or an aryl group. Concrete examples of $R^1$ include methyl, ethyl, n-propyl, isopropyl, isobutyl, pentyl, hexyl, octyl, cyclopentyl, cyclohexyl, phenyl and tolyl.

Concrete examples of such organoaluminum compounds (c) include trialkylaluminum such as trimethylaluminum, triethylaluminum, triisopropylaluminum, triisobutylaluminum, trioctylaluminum and tri-2-ethylhexylaluminum;

alkenylaluminum such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide; and alkylaluminum hydrides such as diethylaluminum hydride and diisobutylaluminum hydride.

Furthermore, there may also be used other organoaluminum compounds represented by the following formula [V] as the organoaluminum compound catalyst component (c);

$$R^1_nAlY_{3-n} \quad [V]$$

wherein $R^1$ is as defined previously, Y is $-OR^2$, $-OSiR^3_3$, $-OAlR^4_2$, $-NR^5_2$, $-SiR^6_3$ or $-N(R^7)AlR^8_2$, n is 1 to 2, $R^2$, $R^3$, $R^4$ and $R^8$ are each methyl, ethyl, isopropyl, isobutyl, cyclohexyl or phenyl, $R^5$ is hydrogen, methyl, ethyl, isopropyl, phenyl or trimethylsilyl, $R^6$ and $R^7$ are each methyl or ethyl.

The organoaluminum compounds as mentioned above include, in concrete, such compounds as enumerated below.

(1) Compounds of the formula $R^1_nAl(OR^2)_{3-n}$ such as dimethylaluminum methoxide, diethylaluminum ethoxide and diisobutylaluminum methoxide.

(2) Compounds of the formula $R^1_nAl(OSiR^3_3)_{3-n}$ such as $Et_2Al(OSiMe_3)$, $(iso-Bu)_2Al(OSiMe_3)$ and $(iso-Bu)_2Al(OSiEt_3)$.

(3) Compounds of the formula $R^1_nAl(OAlR^4_2)_{3-n}$ such as $Et_2AlOAlEt_2$ and $(iso-Bu)_2AlOAl(iso-Bu)_2$.

(4) Compounds of the formula $R^1_nAl(NR^5_2)_{3-n}$ such as $Me_2AlNEt_2$, $Et_2AlNHMe$, $Me_2AlNHEt$, $Et_2AlN(SiMe_3)_2$, $(iso-Bu)_2AlN(SiMe_3)_2$.

(5) Compounds of the formula $R^1_nAl(SiR^6_3)_{3-n}$ such as $(iso-Bu)_2AlSiMe_3$.

(6) Compounds of the formula $$R^1_nAl(NAlR^8_2)_{3-n}$$
$$\phantom{R^1_nAl(N}|\phantom{AlR^8_2)_{3-n}}$$
$$\phantom{R^1_nAl(}R^7$$

such as $$Et_2AlNAlEt_2$$
$$\phantom{Et_2Al}|$$
$$\phantom{Et_2AlN}Me$$

and (iso-Bu)

Of the organoaluminum compounds as exemplified above, preferred are those having the formulas $R^1{}_3Al, R^1{}_nAl(OR^2)_{3-n}$ and $R^1{}_nAl(OAlR^4{}_2)_{3-n}$ and particularly preferred are those having the above-mentioned formulas in which R is isoalkyl and n is 2.

In the preparation of the ethylene/α-olefin copolymers [A1] to [A4] and [A6], a catalyst prepared by contacting the component (a), the component (b) and the carrier, and if necessary the component (c), is preferably used. The contact between the components (a) to (c) and the carrier may be conducted in an arbitrarily selected order, but preferably the carrier is first contacted with the component (a), then with the component (b) and if necessary with the component (c). Further, it is preferred that at least two kinds of the transition metal compounds are beforehand mixed to form the component (b) and then the component (b) is contacted with other components.

The contact between the components (a) to (c) and the carrier can be carried out in an inert hydrocarbon solvent. Concrete examples of the inert hydrocarbon solvent used for preparing the catalyst include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures thereof.

When the component (a), the component (b) and the carrier, and if necessary, the component (c) are mixed and contacted, the component (b) is used in an amount of usually $5\times10^{-6}$ to $5\times10^{-4}$ mol, preferably $10^{-5}$ to $2\times10^{-4}$ mol, per 1 g of the carrier, and the concentration of the component (b) is in the range of about $10^{-4}$ to $2\times10^{-2}$ mol/l (solvent), preferably $2\times10^{-4}$ to $10^{-2}$ mol/l (solvent). An atomic ratio (Al/transition metal) of the aluminum atom (Al) in the component (a) to the transition metal in the component (b) is in the range of usually 10 to 500, preferably 20 to 200. An atomic ratio (Al-c/Al-a) of the aluminum atom (Al-c) in the component (c) which is optionally used to the aluminum atom (Al-a) in the component (a) is in the range of usually 0.02 to 3, preferably 0.05 to 1.5. The temperature for contacting the component (a), the component (b) and the carrier, and if necessary the component (c), is in the range of usually −50 to 150 °C., preferably −20 to 120 °C., and the period of time therefor is in the range of 1 minute to 50 hours, preferably 10 minutes to 25 hours.

In the preparation of the ethylene/α-olefin copolymers [A5] and [A7], a catalyst prepared by contacting the component (a), the component (b') and the carrier, and if necessary the component (c), is preferably used. The catalyst can be prepared in a manner similar to that for the catalyst used for preparing the above-mentioned ethylene/α-olefin copolymers [A1] to [A4] and [A6].

In the catalyst for olefin polymerization used for the preparation of the ethylene/α-olefin copolymers [A1] to [A7], the transition metal atom derived from the component (b) (or the component (b')) is desirably supported in an amount of $5\times10^{-6}$ to $5\times10^{-4}$ g.atom, preferably $10^{-5}$ to $2\times10^{-4}$ g.atom, per 1 g of the carrier, and the aluminum atom derived from the component (a) and the component (c) is desirably supported in an amount of $10^{-3}$ to $5\times10^{-2}$ g.atom, preferably $2\times10^{-3}$ to $2\times10^{-2}$ g.atom, per 1 g of the carrier.

The catalyst for olefin polymerization used for the preparation of the ethylene/α-olefin copolymers [A1] to [A4] and [A6] may be a prepolymerized catalyst obtained by prepolymerizing an olefin in the presence of the component (a), the component (b), the carrier and if necessary the component (c). The prepolymerization can be carried out by introducing an olefin into an inert hydrocarbon solvent in the presence of the component (a), the component (b), the carrier and if necessary the component (c).

Examples of the olefins employable for the prepolymerization include ethylene, and α-olefins having 3 to 20 carbon atoms such as propylene, 1-butene, 1-pentene, 4-methyl-1-pentene, 1-hexene, 1-octene, 1-decene, 1-dodecene and 1-tetradecene. Of these, particularly preferred is ethylene or a combination of ethylene and the same α-olefin as used for the polymerization.

In the prepolymerization, the component (b) is used in an amount of usually $10^{-6}$ to $2\times10^{-2}$ mol/l (solvent), preferably $5\times10^{-5}$ to $10^{-2}$ mol/l (solvent). Further, the component (b) is used in an amount of usually $5\times10^{-6}$ to $5\times10^{-4}$ mol, preferably $10^{-5}$ to $2\times10^{-4}$ mol, per 1 g of the carrier. An atomic ratio (Al/transition metal) of the aluminum atom (Al) in the component (a) to the transition metal in the component (b) is in the range of usually 10 to 500, preferably 20 to 200. An atomic ratio (Al-c/Al-a) of the aluminum atom (Al-c) in the component (c) which is optionally used to the aluminum atom (Al-a) in the component (a) is in the range of usually 0.02 to 3, preferably 0.05 to 1.5. The temperature for the prepolymerization is in the range of −20 to 80° C., preferably 0 to 60° C., and the period of time therefor is in the range of 0.5 to 100 hours, preferably 1 to 50 hours.

The prepolymerized catalyst can be prepared, for example, in the following manner. First, the carrier is suspended in an inert hydrocarbon to give a suspension. To the suspension is added the organoaluminum oxy-compound (component (a)) to perform reaction for a predetermined time. Then, a supernatant liquid is removed, and the resultant solid component is again suspended in an inert hydrocarbon. Subsequently, to the system are added the transition metal compound (component (b)) to perform reaction for a predetermined time. A supernatant liquid is removed again to obtain a solid catalyst component. The solid catalyst component thus obtained is added to an inert hydrocarbon containing the organoaluminum compound (component (c)), followed by introducing an olefin, to obtain the prepolymerized catalyst.

The catalyst for olefin polymerization used for preparing the ethylene/α-olefin copolymers [A5] and [A7] may be a prepolymerized catalyst obtained by prepolymerizing an olefin in the presence of the component (a), the component (b'), the carrier and if necessary the component (c). The prepolymerized catalyst can be prepared by the process similar to those described in the preparation of the prepolymerized catalyst used in the production of the ethylene/α-olefin copolymers [A1] to [A4] and [A6].

It is desired that an olefin polymer is prepared by the prepolymerization in an amount of 0.1 to 500 g, preferably 0.2 to 300 g, more preferably 0.5 to 200 g, per 1 g of the carrier. In the prepolymerized catalyst, it is desired that the component (b) (or the component (b')) is supported in an amount of about $5 \times 10^{-6}$ to $5 \times 10^{-4}$ g.atom, preferably $10^{-5}$ to $2 \times 10^{-4}$ g.atom, in terms of the transition metal atom, per 1 g of the carrier; and the aluminum atom (Al) derived from the component (a) and the component (c) is supported in such an amount that the molar ratio (Al/M) of the aluminum atom (Al) derived from the component (a) and the component (c) to the transition metal atom (M) derived from the component (b) (or the component (b')) is in the range of 5 to 200, preferably 10 to 150.

The prepolymerization may be carried out either batchwise or continuously, and may be carried out under reduced pressure, atmospheric pressure or application of pressure. In the prepolymerization, hydrogen is desirably allowed to exist to obtain a prepolymer having an intrinsic viscosity [η], as measured in decalin at 135° C., of 0.2 to 7 dl/g, preferably 0.5 to 5 dl/g.

The ethylene/α-olefin copolymers [A1] to [A7] forming the ethylene copolymer composition of the invention can be obtained by copolymerizing ethylene with an α-olefin of 3 to 20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene, in the presence of, for example, the aforesaid catalyst for olefin polymerization.

In the invention, the copolymerization of ethylene with the α-olefin is carried out either in a gas phase or in a liquid phase such as slurry. In the slurry polymerization, an inert hydrocarbon may be used as a solvent, or the olefin itself may be used as a solvent.

Examples of the inert hydrocarbon solvent used for the slurry polymerization include aliphatic hydrocarbons, such as propane, butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; and petroleum fractions, such as gasoline, kerosine and gas oil. Of these, preferred are aliphatic hydrocarbons, alicyclic hydrocarbons and petroleum fractions.

In the slurry polymerization or the gas phase polymerization, the above-described catalyst is used in such an amount that the concentration of the transition metal atom in the polymerization reaction system is in the range of usually $10^{-8}$ to $10^{-3}$ g.atom/l (solvent), preferably $10^{-7}$ to $10^{-4}$ g.atom/l (solvent).

In the polymerization, an organoaluminum oxy-compound which is the same as the component (a) and/or the organoaluminum compound (c) may be added. In this case, the atomic ratio (Al/M) of the aluminum atom (Al) derived from the organoaluminum oxy-compound and the organoaluminum compound to the transition metal atom (M) derived from the transition metal compound (b) (or the transition metal compound (b')) is in the range of 5 to 300, preferably 10 to 200, more preferably 15 to 150.

In the invention, the temperature for the slurry polymerization is in the range of usually −50 to 100° C., preferably 0 to 90° C., while the temperature for the gas phase polymerization is in the range of usually 0 to 120° C., preferably 20 to 100° C.

The polymerization pressure is in the range of usually atmospheric pressure to 100 kg/cm², preferably 2 to 50 kg/cm². The polymerization may be carried out batchwise, semi-continuously or continuously.

Further, the polymerization may be conducted in two or more stages having different reaction conditions.

High-pressure Radical Polymerization Low-density Polyethylene [B1]

The high-pressure radical polymerization low-density polyethylene [B1] forming the ethylene copolymer compositions according to the present invention is a branched polyethylene having a number of long chain branches prepared by so-called high-pressure radical polymerization, and has a melt flow rate (MFR), as determined in accordance with ASTM D1238-65T under the conditions of a temperature of 190° C. and a load of 2.16 kg, of 0.01 to 100 g/10 min, preferably 0.05 to 10 g/10 min, more preferably 0.1 to 8 g/10 min.

The high-pressure radical polymerization low-density polyethylene [B1] has a density (d) of 0.910 to 0.930 g/cm³.

The density of a low-density polyethylene is determined by means of a density gradient tube using a strand which has been obtained in the above-mentioned melt flow rate (MFR) measurement and which is treated by heating at 120° C. for 1 hour and slowly cooling to room temperature over 1 hour.

Further, in the high-pressure radical polymerization low-density polyethylene [B1], a swell ratio indicating a degree of the long chain branch, namely, a ratio (Ds/D) of a diameter (Ds) of a strand to an inner diameter (D) of a nozzle, is desirably not less than 1.3. The strand used herein is a strand extruded from a nozzle having an inner diameter (D) of 2.0 mm and a length of 15 mm at an extrusion rate of 10 mm/min and a temperature of 190° C. using a capillary type flow property tester.

The high-pressure radical polymerization low-density polyethylene [B1] may be a copolymer obtained by copolymerizing ethylene with a polymerizable monomer such as other α-olefin, vinyl acetate or acrylic ester, provided that the object of the invention is not marred.

Crystalline Polyolefin [B2]

The crystalline polyolefin [B-2] forming the ethylene copolymer composition accrding to the present invention is at least one crystalline polyolefin selected from the following crystalline polyolefins (B-I) to (B-III).

Crystalline Polyolefin (B-I)

The crystalline polyolefin (B-I) is an ethylene homopolymer having a crystallinity measured by X-ray diffractometry of not less than 65%, or a copolymer of ethylene with an α-olefin of 3 to 20 carbon atoms having the crystallinity of not less than 65%. The crystalline polyolefin (B-I) desirably has a melt flow rate (MFR) under the conditions of a temperature of 190° C. and a load of 2.16 kg, of 0.01 to 100 g/10 min, preferably 0.05 to 50 g/10 min, and desirably has a density of more than 0.900 g/cm³, preferably 0.930 to 0.970 g/cm³.

Examples of the α-olefin of 3 to 20 carbon atoms include propylene, 1-butene, 1-pentene, 1-hexene, 4-methyl-1-pentene, 1-octene, 1-decene and mixtures thereof. Of these, an α-olefin of 3 to 10 carbon atoms is preferably employed. A molar ratio of ethylene to α-olefin (ethylene/α-olefin) in the copolymer varies depending on the kind of the α-olefin used, but generally is in the range of 100/0 to 99/1, preferably 100/0 to 99.5/0.5.

The crystalline polyolefin (B-I) may contain constituent units other than the constituent units derived from α-olefin, such as those derived from diene compounds, provided that the properties of the crystalline polyolefin (B-1) are not marred.

Examples of the constituent units other than the constituent units derived from α-olefin include constituent units derived from chain non-conjugated dienes such as 1,4-hexadiene, 1,6-octadiene, 2-methyl-1,5-hexadiene, 6-methyl-1,5-heptadiene and 7-methyl-1,6-octadiene;

constituent units derived from cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and constituent units derived from diene compounds such as 2,3-diisopropylidene-5-norbornene, 2-ethylidene-3-isopropylidene-5-norbornene and 2-propenyl-2,2-norbornadiene.

The diene components may be used alone or in combination. The content of the diene component is usually in the range of 0 to 1% by mol, preferably 0 to 0.5% by mol.

The crystalline polyolefin (B-I) can be prepared by a known process.

In the second ethylene copolymer composition, a crystalline polyolefin other than the ethylene/α-olefin copolymer [A2] is used as the crystalline polyolefin (B-I). In the fifth ethylene copolymer composition, a crystalline polyolefin other than the ethylene/α-olefin copolymer [A2] is used as the crystalline polyolefin (B-I).

Crystalline Polyolefin (B-II)

The crystalline polyolefin (B-II) is a propylene homopolymer having a crystallinity measured by X-ray diffractometry of not less than 50%, or a copolymer of propylene with at least one olefin selected from ethylene and an α-olefin of 4 to 20 carbon atoms having the crystallinity of not less than 30%. The crystalline polyolefin (B-II) desirably has a melt flow rate (MFR), as determined under the conditions of a temperature of 230° C. and a load of 2.16 kg, of 0.1 to 100 g/10 min, preferably 0.5 to 50 g/10 min, and desirably has a density of more than 0.900 g/cm$^3$, preferably 0.900 to 0.920 g/cm$^3$.

Examples of the α-olefin of 4 to 20 carbon atoms include 1-butene, 1-pentene, 1-hexene, 4-methyl-1-pentene, 1-octene, 1-decene and mixtures thereof. Of these, an α-olefin of 4 to 10 carbon atoms is preferably employed.

In the copolymer of propylene with at least one of ethylene and α-olefin of 4 to 20 carbon atoms, a molar ratio of propylene to ethylene and α-olefin of 4 to 20 carbon atoms (propylene/α-olefin, α-olefin includes ethylene) varies depending on the kind of the α-olefin used, but generally is in the range of 100/0 to 90/10, preferably 100/0 to 95/5.

The crystalline polyolefin (B-II) may contain constituent units derived from the diene compounds employable for the aforesaid crystalline polyolefin (B-I), provided that the properties of the crystalline polyolefin (B-II) are not marred. The content of the diene component is usually in the range of 0 to 1% by mol, preferably 0 to 0.5% by mol.

The crystalline polyolefin (B-II) can be prepared by a known process.

Crystalline Polyolefin (B-III)

The crystalline polyolefin (B-III) is a homopolymer of an α-olefin of 4 to 20 carbon atoms having a crystallinity measured by X-ray diffractometry of not less than 30%, or a copolymer of α-olefins of 4 to 20 carbon atoms having the crystallinity of not less than 30%. The crystalline polyolefin (B-III) desirably has a melt flow rate (MFR), as determined under the conditions of a temperature of 230° C. and a load of 2.16 kg, of 0.1 to 100 g/10 min, preferably 0.5 to 50 g/10 min, and desirably has a density of more than 0.900 g/cm$^3$, preferably 0.900 to 0.920 g/cm$^3$.

Examples of the α-olefin of 4 to 20 carbon atoms include 1-butene, 1-pentene, 1-hexene, 4-methyl-1-pentene, 1-octene and 1-decene. Of these, an α-olefin of 4 to 10 carbon atoms is preferably employed.

In the copolymer comprising at least two kinds of α-olefins of 4 to 20 carbon atoms, a molar ratio ((a)/(b)) of one (α-olefin (a) selected from α-olefins of 4 to 20 carbon atoms to the other α-olefin (b) selected from α-olefins of 4 to 20 carbon atoms varies depending on the kind of the α-olefins used, but generally is in the range of 100/0 to 90/10, preferably 100/0 to 95/5.

The crystalline polyolefin (B-III) used in the invention may contain constituent units derived from the diene compounds employable for the aforesaid crystalline polyolefin (B-I), provided that the properties of the crystalline polyolefin (B-III) are not marred. The content of the diene component is usually in the range of 0 to 1% by mol, preferably 0 to 0.5% by mol.

The crystalline polyolefin (B-III) can be prepared by a known process.

Olefin Type Elastomer [B3]

The olefin type elastomer [B3] forming the ethylene copolymer compositions according to the invention is a polymer of ethylene or an α-olefin of 3 to 20 carbon atoms, or a copolymer of two or more kinds of olefins selected from ethylene and α-olefins of 3 to 20 carbon atoms. The olefin type elastomer [B3] desirably has a density of not more than 0.900 g/cm$^3$, preferably 0.860 to 0.900 g/cm$^3$, and desirably has a melt flow rate (MFR), as determined under the conditions of a temperature of 190° C. and a load of 2.16 kg, of 0.01 to 100 g/10 min, preferably 0.05 to 50 g/10 min. The olefin type elastomer [B3] desirably has a crystallinity measured by X-ray diffractometry of less than 30%, or desirably is amorphous.

Examples of the α-olefin of 3 to 20 carbon atoms include propylene, 1-butene, 1-pentene, 1-hexene, 4-methyl-1-pentene, 1-octene, 1-decene and mixtures thereof. Of these, an α-olefin having 3 to 10 carbon atoms is preferably employed.

The olefin type elastomer [B3] may contain constituent units other than the constituent units derived from α-olefin, such as those derived from diene compounds as mentioned above, provided that the properties of the olefin type elastomer are not marred.

The diene components may be used alone or in combination. The content of the diene component is usually not more than 10% by mol, preferably in the range of 0 to 5% by mol.

A concrete example of the olefin type elastomer [B3] is a copolymer comprising constituent units derived from ethylene in an amount of 0 to 95% by mol, preferably 30 to 92% by mol, more preferably 50 to 90% by mol, constituent units derived from an α-olefin of 3 to 20 carbon atoms in an amount of 1 to 100% by mol, preferably 4 to 70% by mol, more preferably 8 to 50% by mol, and constituent units derived from a diene component in an amount of 0 to 10% by mol, preferably 0 to 5% by mol, more preferably 0 to 3% by mol.

The olefin type elastomer [B3] can be prepared by a known process using a catalyst of Ti type, V type, Zr type, etc.

Graft Modified Ethylene/α-olefin (co)polymer [B4]

The graft modified ethylene/α-olefin (co)polymer [B4] forming the ethylene copolymer composition can be obtained by graft modifying an ethylene polymer or a copolymer of ethylene and an α-olefin of 3 to 20 carbon atoms with a polar monomer.

In the above mentioned ethylene copolymer, a molar ratio of ethylene to α-olefin (ethylene/α-olefin) in the copolymer varies depending on the kind of the α-olefin used, but generally is in the range of 1/99 to 99/1, preferably 50/50 to 99/5. When the α-olefin is propylene, the molar ratio is preferably 50/50 to 90/10. When the α-olefin has 4 or more carbon atoms, the molar ratio is preferably 80/20 to 95/5.

The ethylene polymer or the ethylene copolymer desirably has an intrinsic viscosity [η] as measured in decalin at 135° C. of 0.4 to 7 dl/d, preferably 0.5 to 5 dl/g.

Examples of the α-olefin of 3 to 20 carbon atoms forming the ethylene copolymer include propylene, 1-butene, 1-pentene, 2-methyl-1-butene, 3-methyl-1-butene, 1-hexene, 3-methyl-1-pentene, 4-methyl-1-pentene, 3,3-dimethyl-1-butene, 1-heptene, methyl-1-hexene, dimethyl-1-pentene, trimethyl-1-butene, ethyl-1-pentene, 1-octene, methyl-1-pentene, dimethyl-1-hexene, trimethyl-1-pentene, ethyl-1-hexene, methylethyl-1-pentene, diethyl-1-butene, propyl-1-pentene, 1-decene, methyl-1-nonene, dimethyloctene, trimethyl-1-heptene, ethyl-1-octene, methylethyl-1-heptene, diethyl-1-hexene, 1-dodecene, hexadodecene and mixtures thereof. Of these, an α-olefin of 3 to 10 carbon atoms is preferably employed.

In the invention, in addition to the recurring units derived from ethylene or an α-olefin of 3 to 20 carbon atoms, the ethylene (co)polymer may contain recurring units derived from other compound which is polymerizable with ethylene or the α-olefin.

Examples of the other compounds include chain polyene compounds, cyclic polyene compounds and cyclic monoene compounds.

These polyene compounds are those having at least two conjugated or non-conjugated olefinic double bonds.

Examples of the chain polyene compounds include 1,4-hexadiene, 1,5-hexadiene, 1,7-octadiene, 1,9-decadiene, 2,4,6-octatriene, 1,3,7-octatriene, 1,5,9-decatriene and divinylbenzene.

Examples of the cyclic polyene compounds include 1,3-cyclopentadiene, 1,3-cyclohexadiene, 5-ethyl-1,3-cyclohexadiene, 1,3-cycloheptadiene, dicyclopentadiene, dicyclohexadiene, 5-ethylidene-2-norbornene, 5-vinyl-2-norbornene, 5-isopropylidene-2-norbornene, methylhydroindene, 2,3-diisopropylidene-5-norbornene, 2-ethylidene-3-isopropylidene-5-norbornene, 2-ethylidene-3-isopropylidene-5-norbornene and 2-propenyl-2,5-norbornadiene.

Examples of the cyclic monoene compounds include:

monocycloalkenes, such as cyclopropene, cyclobutene, cyclopentene, cyclohexene, 3-methylcyclohexene, cycloheptene, cyclooctene, cyclodecene, cyclododecene, tetracyclodecene, octacyclodecene and cycloeicosene;
bicycloalkenes, such as norbornene, 5-methyl-2-norbornene, 5-ethyl-2-norbornene, 5-isobutyl-2-norbornene, 5,6-dimethyl-2-norbornene, 5,5,6-trimethyl-2-norbornene and 2-bornene;
tricycloalkenes, such as 2,3,3a,7a-tetrahydro-4,7-methano-1H-indene and 3a,5,6,7a-tetrahydro-4,7-methano-1H-indene;
tetracycloalkenes, such as 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene and 2,3-dichloro-1,4,5,8-dimethano-1,2,3,4,4a,5,8,8a-octahydronaphthalene; and
polycycloalkenes, such as hexacyclo$[6,6,1,1^{3.6},1^{10.13},0^{2.7},0^{9.14}]$heptadecene-4, pentacyclo$[8,8,1^{2.9},1^{4.7},1^{11.18},0,0^{3.8},0^{12.17}]$heneicosene-5 and octacyclo$[8,8,1^{2.9},1^{4.7},1^{11.18},0,0^{3.8},0^{12.17}]$docosene-5.

The ethylene (co)polymer may further contain constituent units derived from styrene or substituted styrene.

The polyene components may be used alone or in combination. The content of the polyene component is usually in the range of 1 to 20% by mol, preferably 2 to 15% by mol.

The graft modified ethylene (co)polymer [B4] forming the ethylene copolymer composition according to the present invention can be obtained by causing the ethylene (co) polymer as mentioned above to react with a polar monomer described below in the presence of a radical initiator.

Examples of the polar monomer include hydroxyl group-containing ethylenic unsaturated compounds, amino group-containing ethylenic unsaturated compounds, epoxy group-containing ethylenic unsaturated compounds, aromatic vinyl compounds, unsaturated carboxylic acids, derivatives of these acids, vinyl ester compounds and vinyl chloride.

Concrete examples of the hydroxyl group-containing ethylenic unsaturated compounds include (meth)acrylates, such as hydroxyethyl (meth)acrylate, 2-hydroxypropyl (meth)acrylate, 3-hydroxypropyl (meth)acrylate, 2-hydroxy-3-phenoxypropyl (meth)acrylate, 3-chloro-2-hydroxypropyl (meth)acrylate, glycerol mono(meth)acrylate, pentaerythritol mono(meth)acrylate, trimethylolpropane mono(meth) acrylate, tetramethylolethane mono(meth)acrylate, butanediol mono(meth)acrylate, polyethylene glycol mono(meth) acrylate and 2-(6-hydroxyhexanoyloxy)ethyl acrylate; and other compounds, such as 10-undecene-1-ol, 1-octene-3-ol, 2-methanol norbornene, hydroxystyrene, hydroxethyl vinyl ether, hydroxybutyl vinyl ether, N-methylolacrylamide, 2-(meth)acryloyloxyethyl acid phosphate, glycerol monoallyl ether, allyl alcohol, allyloxyethanol, 2-butene-1,4-diol and glycerol monoalcohol.

The amino group-containing ethylenic unsaturated compound is a compound having an ethylenic double bond and an amino group. An example of such compound is a vinyl monomer having at least one substituted or unsubstituted amino group represented by the following formula:

wherein $R^1$ is hydrogen, a methyl group or an ethyl group; and $R^2$ is hydrogen, an alkyl group having 1 to 12 carbon atoms, preferably 1 to 8 carbon atoms, or a cycloalkyl group having 6 to 12 carbon atoms, preferably 6 to 8 carbon atoms. These alkyl and cycloalkyl groups may further have a substituent group.

Concrete examples of such amino group-containing ethylenic unsaturated compound include alkyl acrylate type and alkyl methacrylate type derivatives, such as aminoethyl (meth)acrylate, propylaminoethyl (meth)acrylate, dimethylaminoethyl methacrylate, aminopropyl (meth)acrylate, phenylaminoethyl methacrylate and cyclohexylaminoethyl methacrylate; vinyl amine type derivatives, such as N-vinyldiethylamine and N-acetylvinylamine; allylamine type derivatives, such as allylamine, methacrylamine, N-methylacrylamine, N,N-dimethylacrylamide and N,N-dimethylaminopropylacrylamide; acrylamide type derivatives, such as acrylamide and N-methylacrylamide; aminostyrenes, such as p-aminostyrene; and other compounds, such as 6-aminohexyl succinimide and 2-aminoethyl succinimide.

The epoxy group-containing ethylenic unsaturated compound is a monomer having a polymerizable unsaturated bond and at least one epoxy group in one molecule.

Concrete examples of such epoxy group-containing ethylenic unsaturated compound include:

glycidyl acrylate and glycidyl methacrylate;
mono and alkylglycidyl esters of dicarboxylic acids (number of carbon atoms of the alkyl group in the case of monoglycidyl ester: 1–12), such as monoglycidyl maleate, diglycidyl maleate, monoglycidyl fumarate, diglycidyl fumarate, monoglycidyl crotonate, diglycidyl crotonate, monoglycidyl tetrahydrophthalate, diglycidyl tetrahydrophthalate, monoglycidyl itaconate, diglycidyl itaconate, monoglycidyl butenetricarboxylate, diglycidyl butenetricarboxylate, monoglycidyl citraconate, diglycidyl citraconate, monoglycidyl ester of endo-cis-bicyclo [2.2.1]hept-5-ene-2,3-dicarboxylic acid (nadic acid™), diglycidyl ester thereof, monoglycidyl ester of endo-cis-bicyclo[2.2.1]hept-5-ene-2-methyl-2,3-dicarboxylic acid (methylnadic acid™), diglycidyl ester thereof, monoglycidyl allylsuccinate and diglycidyl allylsuccinate; and other compounds, such as alkylglycidyl p-styrenecarboxylate, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide.

The aromatic vinyl compound is, for example, a compound represented by the following formula:

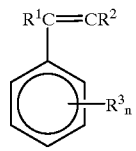

wherein $R^1$ and $R^2$ are each independently hydrogen or an alkyl group of 1 to 3 carbon atoms (concretely, methyl, ethyl, propyl or isopropyl), $R^3$ is a hydrocarbon group of 1 to 3 carbon atoms (concretely, methyl, ethyl, propyl or isopropyl) or a halogen atom (concretely, chlorine, bromine or iodine), and n is an integer of 0 to 5, preferably an integer of 1 to 5.

Concrete examples of such aromatic vinyl compound include styrene, α-methylstyrene, o-methylstyrene, p-methylstyrene, m-methylstyrene, p-chlorostyrene, m-chlorostyrene, p-chloromethylstyrene, 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole and N-vinylpyrrolidone.

Examples of the unsaturated carboxylic acids include unsaturated carboxylic acids, such as acrylic acid, methacrylic acid, maleic acid, fumaric acid, tetrahydrophthalic acid, itaconic acid, citraconic acid, crotonic acid, isocrotonic acid, norbornenedicarboxylic acid and bicyclo[2,2,1]hept-2-ene-5,6-dicarboxylic acid; anhydrides of these acids; and derivatives of these acids (e.g., acid halides, amides, imides and esters). Concrete examples of such compounds include malenyl chloride, malenyl imide, maleic anhydride, itaconic anhydride, citraconic anhydride, tetrahydrophthalic anhydride, bicyclo[2,2,1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo [2,2,1]hept-2-ene-5,6-dicarboxylate, hydroxyethyl (meth) acrylate, hydroxypropyl (meth)acrylate, glycidyl (meth) acrylate, aminoethyl methacrylate and aminopropyl methacrylate. Of these, preferred are (meth)acrylic acid, maleic anhydride hydroxyethyl (meth)acrylate, glycidyl methacrylate, and aminopropyl methacrylate.

Examples of the vinyl ester compounds include vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-t-butyl benzoate, vinyl salicylate and vinyl cyclohexanecarboxylate.

The polar monomer is used in an amount of usually 1 to 100 parts by weight, preferably 5 to 80 parts by weight, per 100 parts by weight of the ethylene (co)polymer.

As the radical initiator, organic peroxides and azo compounds can be employed.

Examples of the organic peroxides include dicumyl peroxide, di-t-butyl peroxide, 2,5-dimethyl-2,5-bis(t-butylperoxy)hexane, 2,5-dimethyl-2,5-bis(t-butylperoxy) hexyne-3,1,3-bis(t-butylperoxyisopropyl)benzene, 1,1-bis (t-butylperoxy)valerate, benzoyl peroxide, t-butyl peroxybenzoate, acetyl peroxide, isobutyryl peroxide, octanoyl peroxide, decanoyl peroxide, lauroyl peroxide, 3,5,5-trimethylhexanoyl peroxide, 2,4-dichlorobenzoyl peroxide and m-toluyl peroxide. Examples of the azo compounds include azoisobutyronitrile and dimethylazoisobutyronitrile.

The radical initiator is desirably used in an amount of 0.001 to 10 parts by weight per 100 parts by weight of the ethylene (co)polymer.

The radical initiator may be used by mixing it per se with the ethylene (co)polymer and the polar monomer, or may be used in the form of a solution containing it in a small amount of an organic solvent. There is no specific limitation on the organic solvent used herein, and any organic solvents may be used as far as they can dissolve the radical initiator. Examples of such organic solvents include aromatic hydrocarbon type solvents, such as benzene, toluene and xylene; aliphatic hydrocarbon type solvents, such as pentane, hexane, heptane, octane, nonane and decane; alicyclic hydrocarbon type solvents, such as cyclohexane, methylcyclohexane and decahydronaphthalene; chlorinated hydrocarbon type solvents, such as chlorobenzene, dichlorobenzene, trichlorobenzene, methylene chloride, chloroform, carbon tetrachloride and tetrachloroethylene; alcohol type solvents, such as methanol, ethanol, n-propanol, iso-propanol, n-butanol, sec-butanol and tert-butanol; ketone type solvents, such as acetone, methyl ethyl ketone and methyl isobutyl ketone; ester type solvents, such as ethyl acetate and dimethyl phthalate; and ether type solvents, such as dimethyl ether, diethyl ether, di-n-amyl ether, tetrahydrofuran and dioxyanisole.

In the graft modification of the ethylene (co)polymer, a reducing material may be employed. The reducing material serves to increase the graft amount in the resultant graft modified ethylene (co)polymer.

Examples of the reducing material include iron(II) ion, chromium ion, cobalt ion, nickel ion, palladium ion, sulfite, hydroxylamine, hydrazine and a compound containing —SH, $SO_3H$, —$NHNH_2$ or —COCH(OH)—.

Concrete examples of such reducing material include ferrous chloride, potassium bichromate, cobalt chloride, cobalt naphthenate, palladium chloride, ethanolamine, diethanolamine, N,N-dimethylaniline, hydrazine, ethylmercaptan, benzenesulfonic acid and p-toluenesulfonic acid.

The reducing material is used in an amount of usually 0.001 to 5 parts by weight, preferably 0.1 to 3 parts by weight, per 100 parts by weight of the ethylene polymer or the ethylene copolymer.

The graft modification of the ethylene (co)polymer can be carried out by a conventionally known process. For example, the ethylene (co)polymer is dissolved in an organic solvent, and to the resultant solution are added the polar monomer, the radical initiator, etc. to perform reaction at a temperature of 70 to 200° C., preferably 80 to 190° C., for a period of 0.5 to 15 hours, preferably 1 to 10 hours.

As the organic solvent used in the graft modification of the ethylene (co)polymer, any organic solvents may be used without any specific limitation as far as they can dissolve the ethylene (co)polymer.

Concrete examples of such organic solvents include aromatic hydrocarbon type solvents, such as benzene, toluene and xylene; and aliphatic hydrocarbon type solvents, such as pentane, hexane and heptane.

The graft modified ethylene (co)polymer may also be prepared by causing the ethylene (co)polymer to react with the polar monomer in an extruder or the like without using any solvent. In this case, the reaction temperature is generally not lower than the melting point of the ethylene (co) polymer, concretely, in the range of 120 to 250° C., and the reaction time is generally in the range of 0.5 to 10 minutes.

In the graft modified ethylene (co)polymer prepared above, the graft amount of the graft group derived from the polar group is usually in the range of 0.1 to 50% by weight, preferably 0.2 to 30% by weight.

Ethylene Copolymer Composition

The first ethylene copolymer composition according to the invention comprises the aforementioned ethylene/α-olefin copolymer [A1] and the high-pressure radical polymerization low-density polyethylene [B1], and a weight ratio ([A1]:[B1]) between the ethylene/α-olefin copolymer [A1] and the high-pressure radical polymerization low-density polyethylene [B1] is in the range of 99:1 to 60:40. The weight ratio ([A1]:[B1]) between the ethylene/α-olefin copolymer [A1] and the high-pressure radical polymerization low-density polyethylene [B1] is preferably in the range of 98:2 to 70:30, more preferably 98:2 to 80:20.

When the amount of the high-pressure radical polymerization low-density polyethylene [B1] is less than the lower limit of the above range, the resulting composition is sometimes improved insufficiently in the transparency and the melt tension, and when the amount thereof is larger than the upper limit of the above range, the resulting composition is sometimes markedly deteriorated in the tensile strength and the stress crack resistance.

The first ethylene copolymer composition according to the invention may contain various additives if desired, for example, weathering stabilizer, heat stabilizer, antistatic agent, anti-slip agent, anti-blocking agent, antifogging agent, lubricant, pigment, dye, nucleating agent, plasticizer, anti-aging agent, hydrochloric acid absorbent and antioxidant, provided that the object of the invention is not marred.

The first ethylene copolymer composition according to the invention can be prepared by known processes, for example, processes described below.

(1) A process of mechanically blending the ethylene/α-olefin copolymer [A1], the high-pressure radical polymerization low-density polyethylene [B1], and if necessary, other optional components by the use of an extruder, a kneader or the like.

(2) A process comprising dissolving the ethylene/α-olefin copolymer [A1], the high-pressure radical polymerization low-density polyethylene [B1], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer [A1], the high-pressure radical polymerization low-density polyethylene [B1], and if necessary, other optional components in an appropriate good solvent to prepare solutions, then mixing the solutions, and removing the solvent from the resulting mixture.

(4) A process of combining the above processes (1) to (3).

The first ethylene copolymer composition according to the present invention is subjected to ordinary air-cooling inflation molding, two-stage air-cooling inflation molding, high-speed inflation molding, T-die film molding, water-cooling inflation molding or the like, to obtain a film. The film thus obtained is excellent in transparency and mechanical strength, and has properties inherently belonging to general LLDPE, such as heat-sealing properties, hot-tack properties, heat resistance and blocking resistance. Further, the film is free from surface stickiness because the ethylene/α-olefin copolymer [A1] has a prominently narrow composition distribution. Moreover, because of the high melt tension, the ethylene copolymer composition is excellent in bubble stability during the inflation molding.

The films obtained from the ethylene/α-olefin copolymer composition of the invention are suitable for various packaging bags such as standard bags, sugar bags, packaging bags for oily goods and packaging bags for moist goods, and agricultural materials. The film may also be used as multilayer films by laminating them on various substrates such as a nylon substrate and a polyester substrate.

The second ethylene copolymer composition according to the invention comprises the aforementioned ethylene/α-olefin copolymer [A1] and the crystalline polyolefin [B2], and a weight ratio ([A1]:[B2]) between the ethylene/α-olefin copolymer [A1] and the crystalline polyolefin [B2] is desirably in the range of 99:1 to 60:40, preferably 95:5 to 70:30, more preferably 95:5 to 80:20.

The second ethylene copolymer composition according to the invention may contain various additives as described above, provided that the object of the invention is not marred.

The second ethylene copolymer composition according to the invention can be prepared by known processes, for example, processes described above.

The second ethylene copolymer composition according to the present invention is subjected to the above mentioned molding methods to obtain a film. The film thus obtained is excellent in balance of transparency and rigidity, and has properties inherently belonging to general LLDPE, such as heat-sealing properties, hot-tack properties and heat resistance. Further, the film is free from surface stickiness because the ethylene/α-olefin copolymer has a prominently narrow composition distribution. Moreover, because of the high melt tension, the ethylene copolymer composition is excellent in bubble stability during the inflation molding.

The films obtained from the ethylene/α-olefin copolymer composition of the invention are suitable for various packaging bags such as standard bags, sugar bags, packaging bags for oily goods and packaging bags for moist goods, and agricultural materials. The film may also be used as multilayer films by laminating them on various substrates such as a nylon substrate and a polyester substrate.

The third ethylene copolymer composition according to the invention comprises the aforementioned ethylene/α-olefin copolymer [A1] and the olefin type elastomer [B3], and a weight ratio ([A1]:[B3]) between the ethylene/α-olefin copolymer [A1] and the olefin type elastomer [B3] is desirably in the range of 99:1 to 60:40, preferably 95:5 to 70:30, more preferably 95:5 to 80:20. The ethylene/α-olefin copolymer [A1] and the olefin type elastomer [B3] are combined so as to that the density ratio ([B3]/[A1]) of the density of the olefin type elastomer [B3] to the density of the ethylene/α-olefin copolymer [A1] is less than 1, preferably 0.905 to 0.980.

The third ethylene copolymer composition according to the invention may contain various additives as described above, provided that the object of the invention is not marred.

The third ethylene copolymer composition according to the invention can be prepared by known processes, for example, processes described above.

The third ethylene copolymer composition according to the present invention is subjected to the above mentioned molding methods to obtain a film. The film thus obtained is excellent in balance of transparency and impact strength, and has properties inherently belonging to general LLDPE, such as heat-sealing properties, hot-tack properties and heat resistance. Further, the film is free from surface stickiness because the ethylene/α-olefin copolymer has a prominently narrow composition distribution. Moreover, because of the high melt tension, the ethylene copolymer composition is excellent in bubble stability during the inflation molding.

The films obtained from the ethylene/α-olefin copolymer composition of the invention are suitable for various packaging bags such as standard bags, sugar bags, packaging bags for oily goods and packaging bags for moist goods, and agricultural materials. The film may also be used as multilayer films by laminating them on various substrates such as a nylon substrate and a polyester substrate.

The fourth ethylene copolymer composition according to the invention comprises the aforementioned ethylene/α-olefin copolymer [A2] and the high-pressure radical polymerization low-density polyethylene [B1], and a weight ratio ([A2]:[B1]) between the ethylene/α-olefin copolymer [A2] and the high-pressure radical polymerization low-density polyethylene [B1] is in the range of 99:1 to 60:40. The weight ratio ([A2]:[B1]) between the ethylene/α-olefin copolymer [A2] and the high-pressure radical polymerization low-density polyethylene [B1] is preferably in the range of 98:2 to 70:30, more preferably 98:2 to 80:20.

When the amount of the high-pressure radical polymerization low-density polyethylene [B1] is less than the lower limit of the above range, the resulting composition is sometimes improved insufficiently in the transparency and the melt tension, and when the amount thereof is larger than the upper limit of the above range, the resulting composition is sometimes markedly deteriorated in the tensile strength and the stress crack resistance.

The fourth ethylene copolymer composition according to the invention may contain various additives as described above, provided that the object of the invention is not marred.

The fourth ethylene copolymer composition according to the invention can be prepared by known processes, for example, processes described above.

The fourth ethylene copolymer composition according to the present invention is subjected to the above mentioned molding methods to obtain a film. The film thus obtained is excellent in transparency and mechanical strength, and has properties inherently belonging to general LLDPE, such as heat-sealing properties, hot-tack properties, heat resistance and blocking resistance. Further, the film is free from surface stickiness because the ethylene/α-olefin copolymer has a prominently narrow composition distribution. Moreover, because of the high melt tension, the ethylene copolymer composition is excellent in bubble stability during the inflation molding.

The films obtained from the ethylene/α-olefin copolymer composition of the invention are suitable for various packaging bags such as standard bags, sugar bags, packaging bags for oily goods and packaging bags for moist goods, and agricultural materials. The film may also be used as multilayer films by laminating them on various substrates such as a nylon substrate and a polyester substrate.

The fifth ethylene copolymer composition according to the invention comprises the aforementioned ethylene/α-olefin copolymer [A2] and the crystalline polyolefin [B2], and a weight ratio ([A2]:[B2]) between the ethylene/α-olefin copolymer [A2] and the crystalline polyolefin [B2] is desirably in the range of 99:1 to 60:40, preferably 95:5 to 70:30, more preferably 95:5 to 80:20.

The fifth ethylene copolymer composition according to the invention may contain various additives as described above, provided that the object of the invention is not marred.

The fifth ethylene copolymer composition according to the invention can be prepared by known processes, for example, processes described above.

The fifth ethylene copolymer composition according to the present invention is subjected to the above mentioned molding methods to obtain a film. The film thus obtained is excellent in balance of transparency and rigidity, and has properties inherently belonging to general LLDPE, such as heat-sealing properties, hot-tack properties and heat resistance. Further, the film is free from surface stickiness because the ethylene/α-olefin copolymer has a prominently narrow composition distribution. Moreover, because of the high melt tension, the ethylene copolymer composition is excellent in bubble stability during the inflation molding.

The films obtained from the ethylene/α-olefin copolymer composition of the invention are suitable for various packaging bags such as standard bags, sugar bags, packaging bags for oily goods and packaging bags for moist goods, and agricultural materials. The film may also be used as multilayer films by laminating them on various substrates such as a nylon substrate and a polyester substrate.

The sixth ethylene copolymer composition according to the invention comprises the aforementioned ethylene/α-olefin copolymer [A2] and the olefin type elastomer [B3], and a weight ratio ([A2]:[B3]) between the ethylene/α-olefin copolymer [A2] and the olefin type elastomer [B3] is desirably in the range of 99:1 to 60:40, preferably 95:5 to 70:30, more preferably 95:5 to 80:20. The ethylene/α-olefin copolymer [A2] and the olefin type elastomer [B3] are combined so as to that the density ratio ([B3]/[A2]) of the density of the olefin type elastomer [B3] to the density of the ethylene/α-olefin copolymer [A2] is less than 1, preferably 0.905 to 0.980.

The sixth ethylene copolymer composition according to the invention may contain various additives as described above, provided that the object of the invention is not marred.

The sixth ethylene copolymer composition according to the invention can be prepared by known processes for example, processes described above.

The sixth ethylene copolymer composition according to the present invention is subjected to the above mentioned molding methods to obtain a film. The film thus obtained is excellent in balance of transparency and impact strength, and has properties inherently belonging to general LLDPE, such as heat-sealing properties, hot-tack properties and heat resistance. Further, the film is free from surface stickiness because the ethylene/α-olefin copolymer has a prominently narrow composition distribution. Moreover, because of the high melt tension, the ethylene copolymer composition is excellent in bubble stability during the inflation molding.

The films obtained from the ethylene/α-olefin copolymer composition of the invention are suitable for various packaging bags such as standard bags, sugar bags, packaging bags for oily goods and packaging bags for moist goods, and agricultural materials. The film may also be used as multilayer films by laminating them on various substrates such as a nylon substrate and a polyester substrate.

The seventh ethylene copolymer composition according to the invention comprises the aforementioned ethylene/α-olefin copolymer [A3] and the graft modified ethylene (co)polymer [B4], and a weight ratio ([A3]:[B4]) between the ethylene/α-olefin copolymer [A3] and the graft modified ethylene (co)polymer [B4] is desirably in the range of 99.5:0.5 to 60:40, preferably 99:1 to 70:30.

The seventh ethylene copolymer composition according to the invention may contain various additives as described above, provided that the object of the invention is not marred.

The seventh ethylene copolymer composition according to the invention can be prepared by known processes, for example, processes described above.

The seventh ethylene copolymer composition according to the present invention is subjected to the above mentioned molding methods to obtain a film. The film thus obtained is excellent in transparency and mechanical strength, and has properties inherently belonging to general LLDPE, such as heat-sealing properties, hot-tack properties, heat resistance and blocking resistance. Further, the film is free from surface stickiness because the ethylene/α-olefin copolymer has a prominently narrow composition distribution.

The films obtained from the ethylene/α-olefin copolymer composition of the invention are suitable for various packaging bags such as standard bags, sugar bags, packaging bags for oily goods and packaging bags for moist goods, and agricultural materials. Further, because of their high adhesion strength to nylon, polyester, a metal foil, etc., the film may be used as multi-layer films by laminating them on these substrates.

The eighth ethylene copolymer composition according to the present invention is formed from an ethylene/α-olefin copolymer composition [C1] comprising the ethylene/α-olefin copolymer [A4] and an ethylene/α-olefin copolymer [A5] (with the proviso that the ethylene/α-olefin copolymer [A4] differs from the ethylene/α-olefin copolymer [A5]), and the high-pressure radical polymerization low-density polyethylene [B1].

In the ethylene/α-olefin copolymer composition [C1], the ethylene/α-olefin copolymer [A4] is desirably employed in an amount of 20 to 90% by weight, preferably 40 to 75% by weight, and the ethylene/α-olefin copolymer [A5] is desirably employed in an amount of 10 to 80% by weight, preferably 25 to 60% by weight.

The ethylene/α-olefin copolymers [A4] and [A5] are used in the combination so as to that the density ratio ([A4]/[A5]) of the density of the ethylene/α-olefin copolymers [A4] to the density of the ethylene/α-olefin copolymer [A5] is less than 1, preferably 0.930 to 0.999.

The ethylene/α-olefin copolymer composition [C1] preferably has the following properties (c-i) to (c-vi).

(i) The density (d) is desirably in the range of 0.850 to 0.980 g/cm$^3$, preferably 0.890 to 0.955 g/cm$^3$, more preferably 0.900 to 0.950 g/cm$^3$.

(c-ii) The melt flow rate (MFR) determined under the conditions of a temperature of 190° C. and a load of 2.16 kg is desirably in the range of 0.1 to 100 g/10 min, preferably 0.2 to 50 g/10 min.

(c-iii) The melt tension (MT (g)) at 190° C. and the melt flow rate (MFR) satisfy the relation:

$MT \geq 2.2 \times MFR^{-0.84}$.

(c-iv) The flow index (FI (l/sec)) defined by a shear rate which is given when a shear stress at 190° C. reaches $2.4 \times 10^6$ dyne/cm$^2$ and the melt flow rate (MFR) satisfy the relation:

$FI > 100 \times MFR$, preferably FI>130×MFR, more preferably FI>150×MFR.

(c-v) The temperature (Tm (° C.)) at which the endothermic curve measured by a differential scanning calorimeter (DSC) shows the maximum peak and the density (d) satisfy the relation:

$Tm < 400 \times d - 250$, preferably Tm<450×d−297, more preferably Tm<500×d−344, particularly preferably Tm<550×d−391.

(c-vi) The quantity fraction (W (% by weight)) of a n-decane-soluble component at 23° C. and the density (d) satisfy the relation:
in the case of MFR≦10 g/10 min:

$W < 80 \times \exp(-100(d-0.88)) + 0.1$, preferably W<60×exp(−100(d−0.88))+0.1,
more preferably W<40×exp(−100(d−0.88))+0.1, and in the case of MFR>10 g/10 min:

$W < 80 \times (MFR-9)^{0.26} \times \exp(-100(d-0.88)) + 0.1$.

The ethylene/α-olefin copolymer composition [C1] can be prepared by known processes, for example, processes described above.

Further, the ethylene/α-olefin copolymer composition [C1] may be prepared by forming the ethylene/α-olefin copolymer [A4] and the ethylene/α-olefin copolymer [A5] in two or more copolymerization stages having reaction conditions different from each other, or may be prepared by separately forming the ethylene/α-olefin copolymer [A4] and the ethylene/α-olefin copolymer [A5] by the use of plural polymerizers.

The eighth ethylene copolymer composition according to the invention comprises the aforementioned ethylene/α-olefin copolymer composition [C1] and the high-pressure radical polymerization low-density polyethylene [B1], and a weight ratio ([C1]:[B1]) between the ethylene/α-olefin copolymer composition [C1] and the high-pressure radical polymerization low-density polyethylene [B1] is desirably in the range of 99:1 to 60:40, more preferably 98:2 to 70:30, particularly preferably 98:2 to 80:20.

When the amount of the high-pressure radical polymerization low-density polyethylene [B1] is less than the lower limit of the above range, the resulting composition is sometimes improved insufficiently in the transparency and the melt tension, and when the amount thereof is larger than the upper limit of the above range, the resulting composition is sometimes markedly deteriorated in the tensile strength and the stress crack resistance.

The eighth ethylene copolymer composition according to the invention may contain various additives as described above, provided that the object of the invention is not marred.

The eighth ethylene copolymer composition according to the invention can be prepared by known processes, for example, processes described above.

The eighth ethylene copolymer composition according to the present invention is subjected to the above mentioned molding methods to obtain a film. The film thus obtained is excellent in transparency, mechanical strength and anti-blocking property, and has properties inherently belonging to general LLDPE, such as heat-sealing properties, hot-tack properties and heat resistance. Further, the film is free from surface stickiness because the ethylene/α-olefin copolymers [A4] and [A5] have a prominently narrow composition distribution. Moreover, because of the high melt tension, the ethylene copolymer composition is excellent in bubble stability during the inflation molding.

The films obtained from the ethylene/α-olefin copolymer composition of the invention are suitable for various packaging bags such as standard bags, sugar bags, packaging bags for oily goods and packaging bags for moist goods, and agricultural materials. The film may also be used as multi-layer films by laminating them on various substrates such as a nylon substrate and a polyester substrate.

The ninth ethylene copolymer composition according to the present invention is formed from an ethylene/α-olefin copolymer composition [C2] comprising the ethylene/α-olefin copolymer [A6] and the ethylene/α-olefin copolymer [A5] (with the proviso that the ethylene/α-olefin copolymer [A6] differs from the ethylene/α-olefin copolymer [A5]), and the high-pressure radical polymerization low-density polyethylene [B1].

In the ethylene/α-olefin copolymer composition [C2], the ethylene/α-olefin copolymer [A6] is desirably employed in an amount of 20 to 90% by weight, preferably 40 to 75% by weight, and the ethylene/α-olefin copolymer [A5] is desirably employed in an amount of 10 to 80% by weight, preferably 25 to 60% by weight.

The ethylene/α-olefin copolymers [A6] and [A5] are used in the combination so as to that the density ratio ([A6]/[A5]) of the density of the ethylene/α-olefin copolymers [A6] to the density of the ethylene/α-olefin copolymer [A5] is less than 1, preferably 0.930 to 0.999.

The ethylene/α-olefin copolymer composition [C2] preferably has the aforementioned properties (c-i) to (c-vi).

The ethylene/α-olefin copolymer composition [C2] can be prepared by known processes, for example, processes described above.

Further, the ethylene/α-olefin copolymer composition [C2] may be prepared by forming the ethylene/α-olefin copolymer [A6] and the ethylene/α-olefin copolymer [A5] in two or more copolymerization stages having reaction conditions different from each other, or may be prepared by separately forming the ethylene/α-olefin copolymer [A6] and the ethylene/α-olefin copolymer [A5] by the use of plural polymerizers.

The ninth ethylene copolymer composition according to the invention comprises the aforementioned ethylene/α-olefin copolymer composition [C2] and the high-pressure radical polymerization low-density polyethylene [B1], and a weight ratio ([C2]:[B1]) between the ethylene/α-olefin copolymer composition [C2] and the high-pressure radical polymerization low-density polyethylene [B1] is desirably in the range of 99:1 to 60:40, more preferably 98:2 to 70:30, particularly preferably 98:2 to 80:20.

When the amount of the high-pressure radical polymerization low-density polyethylene [B1] is less than the lower limit of the above range, the resulting composition is sometimes improved insufficiently in the transparency and the melt tension, and when the amount thereof is larger than the upper limit of the above range, the resulting composition is sometimes markedly deteriorated in the tensile strength and the stress crack resistance.

The ninth ethylene copolymer composition according to the invention may contain various additives as described above, provided that the object of the invention is not marred.

The ninth ethylene copolymer composition according to the invention can be prepared by known processes, for example, processes described above.

The ninth ethylene copolymer composition according to the present invention is subjected to the above mentioned molding methods to obtain a film. The film thus obtained is excellent in transparency, mechanical strength and anti-blocking property, and has properties inherently belonging to general LLDPE, such as heat-sealing properties, hot-tack properties and heat resistance. Further, the film is free from surface stickiness because the ethylene/α-olefin copolymers [A6] and [A5] have a prominently narrow composition distribution. Moreover, because of the high melt tension, the ethylene copolymer composition is excellent in bubble stability during the inflation molding.

The films obtained from the ethylene/α-olefin copolymer composition of the invention are suitable for various packaging bags such as standard bags, sugar bags, packaging bags for oily goods and packaging bags for moist goods, and agricultural materials. The film may also be used as multi-layer films by laminating them on various substrates such as a nylon substrate and a polyester substrate.

The tenth ethylene copolymer composition according to the present invention is formed from an ethylene/α-olefin copolymer composition [C3] comprising the ethylene/α-olefin copolymer [A7] and the ethylene/α-olefin copolymer [A5] (with the proviso that the ethylene/α-olefin copolymer [A7] differs from the ethylene/α-olefin copolymer [A5]), and the graft modified ethylene (co)polymer [B4].

In the ethylene/α-olefin copolymer composition [C3], the ethylene/α-olefin copolymer [A7] is desirably employed in an amount of 20 to 90% by weight, preferably 40 to 75% by weight, and the ethylene/α-olefin copolymer [A5] is desirably employed in an amount of 10 to 80% by weight, preferably 25 to 60% by weight.

The ethylene/α-olefin copolymers [A7] and [A5] are used in the combination so as to that the density ratio ([A7]/[A5]) of the density of the ethylene/α-olefin copolymers [A6] to the density of the ethylene/α-olefin copolymer [A5] is less than 1, preferably 0.930 to 0.999.

The ethylene/α-olefin copolymer composition [C3] preferably has the aforementioned properties (c-i) to (c-vi).

The ethylene/α-olefin copolymer composition [C3] can be prepared by known processes, for example, processes described above.

Further, the ethylene/α-olefin copolymer composition [C3] may be prepared by forming the ethylene/α-olefin copolymer [A7] and the ethylene/α-olefin copolymer [A5] in two or more copolymerization stages having reaction conditions different from each other, or may be prepared by separately forming the ethylene/α-olefin copolymer [A7] and the ethylene/α-olefin copolymer [A5] by the use of plural polymerizers.

The tenth ethylene copolymer composition according to the invention comprises the aforementioned ethylene/α-olefin olefin copolymer composition [C3] and the graft modified ethylene (co)polymer [B4], and a weight ratio ([C3]:[B4]) between the ethylene/α-olefin copolymer composition [C3] and the graft modified ethylene (co)polymer [B4] is desirably in the range of 99.5:0.5 to 60:40, more preferably 99:1 to 70:30.

When the amount of the graft modified ethylene (co) polymer [B4] is less than the lower limit of the above range, the resulting composition is sometimes improved insufficiently in the transparency and the melt tension, and when the amount thereof is larger than the upper limit of the above range, the resulting composition is sometimes markedly deteriorated in the tensile strength and the stress crack resistance.

The tenth ethylene copolymer composition according to the invention may contain various additives as described above, provided that the object of the invention is not marred.

The tenth ethylene copolymer composition according to the invention can be prepared by known processes, for example, processes described above.

The tenth ethylene copolymer composition according to the present invention is subjected to the above mentioned molding methods to obtain a film. The film thus obtained is excellent in transparency and mechanical strength, and has properties inherently belonging to general LLDPE, such as heat-sealing properties, hot-tack properties, heat resistance and blocking resistance. Further, the film is free from surface stickiness because the ethylene/α-olefin copolymers [A7] and [A5] have a prominently narrow composition distribution. Moreover, because of low stress within the high-shear region, the ethylene copolymer composition can be extruded at high a high speed, and consumption of electric power is small, resulting in economical advantage.

The films obtained from the ethylene/α-olefin copolymer composition of the invention are suitable for various packaging bags such as standard bags, sugar bags, packaging bags for oily goods and packaging bags for moist goods, and agricultural materials. Further, because of their high adhesion strength to nylon, polyester, a metal foil, etc., the film may be used as multi-layer films by laminating them on these substrates.

EFFECT OF THE INVENTION

The first to sixth ethylene copolymer compositions are excellent in moldability. From such ethylene copolymer compositions, films of high transparency and high mechanical strength can be produced.

The seventh ethylene copolymer composition is excellent in moldability. From such ethylene copolymer composition, a film of high transparency, high mechanical strength and excellent in adhesion property to highly polar materials can be produced.

The eighth and ninth ethylene copolymer compositions are excellent in moldability and heat stability. From such ethylene copolymer compositions, films of high transparency and excellent in anti-blocking property can be produced.

The tenth th ethylene copolymer composition is excellent in moldability. From such ethylene copolymer composition, a film of high transparency, high mechanical strength and excellent in adhesion property to highly polar materials can be produced.

EXAMPLE

The present invention is further described below with reference to examples, but it should be construed that the present invention is in no way limited to those examples.

In the invention, physical properties of films were evaluated in the following manner.

Haze

The haze was measured in accordance with ASTM-D-1003-61.

In the case of a graft modified ethylene/α-olefin copolymer composition, a pressed sheet having a thickness of 0.5 mm was prepared from the composition and the pressed sheet was measured on the haze in accordance with ASTM-D-1003-61. In order to avoid an influence of the sheet surface on the measured value, the haze, namely, internal haze, was measured in the state where the pressed sheet was immersed in an optical cell made of quartz filled with benzyl alcohol.

Gloss

The gloss was measured in accordance with JIS Z8741.

Film Impact

The film impact was measured by means of a pendulum type film impact tester produced by Toyo Seiki Seisakusho K.K.

Tensile Test

A specimen was punched using a dumbbell (JIS No.1) from the film in the machine direction (MD) or the transverse direction (TD) toward the film molding direction, and a modulus in tension (YM) and an elongation at break (EL) of the specimen were measured under the conditions of a distance between chucks of 86 mm and a cross head speed of 200 mm/min.

Adhesion Strength

A pressed sheet of a composition containing modified polyethylene having a thickness of 100 μm was used as a sample. The sample was heat sealed with two kinds of adherends respectively and was measured on the peel strength to evaluate the adhesion strength. One adherend is an aluminum foil having a thickness of 0.5 mm, and the other adherend is a 6-nylon sheet having a thickness of 1.0 mm. The heat sealing between the pressed sheet and the adherend was conducted using a heat sealer under the conditions of a temperature of 200° C., a load of 1 kg/cm$^2$ and a period of 60 sec. After the heat sealing, the pressed sheet with the adherend was cut to give a specimen having a width of 25 mm and a length of 150 mm. The adhesion strength between the two layers (the modified polyethylene composition layer and the adherend layer) of the specimen was measured by peeling the adherend layer in the direction of 180° against the modified polymer layer at a peel rate of 200 mm/min.

Preparation Example 1

[Preparation of a Catalyst Component]

5.0 kg of silica having been dried at 250° C. for 10 hours was suspended in 80 liters of toluene, and the resultant suspension was cooled to 0° C. Thereafter, to the suspension was dropwise added 28.7 liters of a toluene solution of methylaluminoxane (Al: 1.33 mol/l over a period of 1 hour. During the addition, the temperature of the system was kept at 0° C. The reaction was successively carried out at 0° C. for 30 minutes. Then, the temperature of the system was elevated to 95° C. over a period of 1.5 hours, and at the same temperature the reaction was conducted for 20 hours. After that, the temperature of the system was lowered to 60° C., and the supernatant liquid was removed by decantation.

The solid portion obtained above was washed twice with toluene and then again suspended in 80 liters of toluene. To the reaction system were dropwise added 7.4 liters of a toluene solution of bis(1,3-n-butylmethylcyclopentadienyl) zirconium dichloride (Zr: 34.0 mmol/l) and 1.0 liters of a toluene solution of bis(1,3-dimethylcyclopentadienyl) zirconium dichloride (Zr: 28.1 mmol/l) at 80° C. over a period of 30 minutes, and the reaction was further carried out at 80° C. for 2 hours. Then, the supernatant liquid was removed, and the residue was washed twice with hexane to obtain a solid catalyst containing zirconium in an amount of 3.6 mg per 1 g of the solid catalyst.

[Preparation of a Prepolymerized Catalyst]

To 85 liters of hexane containing 1.7 mol of triisobutylaluminum were added 0.85 kg of the solid catalyst obtained above and 255 g of 1-hexene. The resultant mixture was subjected to prepolymerization with ethylene at 35° C. for 12 hours to obtain a prepolymerized catalyst in which polyethylene was prepolymerized in an amount of 10 g per 1 g of the solid catalyst. This ethylene polymer had an intrinsic viscosity [η] of 1.74 dl/g.

[Polymerization]

A 2-liter stainless autoclave thoroughly purged with nitrogen was charged with 150 g of sodium chloride (special grade, available from Wako Junyaku K.K.), followed by drying at 90° C. for 1 hour under a reduced pressure. Then, into the autoclave was introduced a mixed gas consisting of ethylene, 1-butene and hydrogen (1-butene content: 3.0% by mol, hydrogen content: 0.012% by mol) to recover the pressure in the system to atmospheric pressure, and the temperature of the system was set to 70° C.

Subsequently, to the autoclave were added 0.007 mg.atom (in terms of zirconium atom) of the solid catalyst prepared above and 0.7 mmol of triisobutylaluminum.

Thereafter, a mixed gas having the same composition as described above was introduced into the autoclave to initiate polymerization at the total pressure of 8 kg/cm$^2$-G. The temperature in the system immediately rose to 80° C.

Then, only the mixed gas was supplied to keep the total pressure at 8 kg/cm$^2$-G, and polymerization was further conducted at 80° C. for 1.5 hours.

After the polymerization was completed, the reaction product was washed with water to remove sodium chloride. Then, the remaining polymer was washed with methanol and dried at 80° C. overnight under a reduced pressure. As a result, an ethylene/1-butene copolymer (A-1) having MFR, as measured at 190° C. under a load of 2.16 kg, of 2.0 g/10 min, a density of 0.922 g/cm$^3$ and a decane-soluble portion at 23° C. of 0.20% by weight was obtained in an amount of 290 g.

Physical properties of the thus obtained copolymer are set forth in Table 1.

Preparation Example 2

[Preparation of a Catalyst Component]

The procedure for preparing the catalyst component in Preparation Example 1 was repeated except for varying the amounts of the transition metal compound catalyst components to those given below, to prepare a solid catalyst component.

A toluene solution of bis(1,3-n-butylmethylcyclopentadienyl)zirconium dichloride (Zr: 34.0 mmol/l): 6.6 liters A toluene solution of bis(1,3-dimethylcyclopentadienyl) zirconium dichloride (Zr: 28.1 mmol/l): 2.0 liters

[Preparation of a Prepolymerized Catalyst]

The procedure for preparing the prepolymerized catalyst in Preparation Example 1 was repeated except for using the solid catalyst component prepared above, to obtain a prepolymerized catalyst.

[Polymerization]

The procedure for the polymerization in Preparation Example 1 was repeated except for using the prepolymerized catalyst prepared above and varying the comonomer content to that set forth in Table 1, to obtain an ethylene/1-butene copolymer (A-2) different in MFR and density from the copolymer of Preparation Example 1.

Physical properties of the thus obtained copolymer are set forth in Table 1.

Preparation Example 3

[Preparation of a Catalyst Component]

The procedure for preparing the catalyst component in Preparation Example 1 was repeated except for varying the amounts of the transition metal compound catalyst components to those given below, to prepare a solid catalyst component.

A toluene solution of bis(1,3-n-butylmethylcyclopentadienyl)zirconium dichloride (Zr: 34.0 mmol/l): 5.6 liters A toluene solution of bis(1,3-dimethylcyclopentadienyl) zirconium dichloride (Zr: 28.1 mmol/l): 2.9 liters

[Preparation of a Prepolymerized Catalyst]

The procedure for preparing the prepolymerized catalyst in Preparation Example 1 was repeated except for using the solid catalyst component prepared above, to obtain a prepolymerized catalyst.

[Polymerization]

The procedure for the polymerization in Preparation Example 1 was repeated except for using the prepolymerized catalyst prepared above and varying the comonomer content to that set forth in Table 1, to obtain an ethylene/1-butene copolymer (A-3) different in MFR and density from the copolymer of Preparation Example 1.

Physical properties of the thus obtained copolymer are set forth in Table 1.

Example 1

[Preparation of a Composition]

The ethylene/1-butene copolymer (A-1) prepared in Preparation Example 1 and a high-pressure radical polymerization low-density polyethylene (B-1) set forth in Table 2 were dry blended in a mixing ratio of 90/10 [(A-1)/(B-1)]. To the resultant blend were added 0.05% by weight of tri(2,4-di-t-butylphenyl)phosphate as a secondary antioxidant, 0.1 % by weight of n-octadecyl-3-(4'-hydroxy-3', 5'-di-t-butylphenyl)propionate as a heat stabilizer and 0.05% by weight of calcium stearate as a hydrochloric acid absorbent, per 100 parts by weight of the resin. Then, the resultant mixture was kneaded at a preset temperature of 180° C. by means of a conical tapered twin-screw extruder produced by Haake Buchler Instrument Inc., to prepare an ethylene type copolymer composition.

Melt properties of the thus obtained ethylene type copolymer composition are set forth in Table 3.

[Preparation of Film]

The ethylene type copolymer composition obtained above was subjected to inflation by the use of a single-screw extruder (20 mmφ·L/D=26) equipped with a die of 25 mmφ (lip width: 0.7 mm) and a single-slit air ring under the conditions of an air flow rate of 90 l/min, an extrusion rate of 9 g/min, a blow ratio of 1.8, a take-up rate of 2.4 m/min and a processing temperature of 200° C., to form a film having a thickness of 30 μm.

Physical properties of the film formed from the composition are set forth in Table 3.

Examples 2 and 3

[Preparation of a Composition]

The procedure of Example 1 was repeated except for using the ethylene/1-butene copolymers (A-2) and (A-3) prepared in Preparation Examples 2 and 3, to obtain ethylene type copolymer compositions.

[Preparation of Film]

The procedure of Example 1 was repeated except for using the ethylene type copolymer composition prepared above, to form a film having a thickness of 30 μm.

Physical properties of the film formed from the composition are set forth in Table 3.

Reference Examples 1 to 3

The procedure of Example 1 was repeated except for using the ethylene/1-butene copolymers (A-1), (A-2) and (A-3) prepared in Preparation Examples 1 to 3, to form a film having a thickness of 30 μm.

Melt properties of the ethylene/1-butene copolymer and physical properties of the film formed from the copolymer are set forth in Table 3.

Comparative Example 1

The procedure of Preparation Example 1 was repeated except for using bis(1,3-n-butylmethylcyclopentadienyl) zirconium dichloride singly as the transition metal compound catalyst component and varying the fed gas composition, to prepare an ethylene/1-butene copolymer (A-4).

Physical properties of the thus obtained copolymer are set forth in Table 1.

[Preparation of a Composition]

The procedure of Example 1 was repeated except for using the ethylene/1-butene copolymer (A-4) prepared above, to obtain an ethylene type copolymer composition.

[Preparation of Film]

The procedure of Example 1 was repeated except for using the ethylene type copolymer composition prepared above, to form a film having a thickness of 30 μm.

Melt properties of the ethylene type copolymer composition and physical properties of the film formed from the composition are set forth in Table 3.

Comparative Example 2

[Preparation of Film]

The procedure of Example 1 was repeated except for using the ethylene/1-butene copolymer (A-4) prepared in Comparative Example 1, to form a film having a thickness of 30 μm.

Melt properties of the ethylene type copolymer and physical properties of the film formed from the copolymer are set forth in Table 3.

Comparative Example 3

The procedure of Preparation Example 1 was repeated except for using bis(1,3-dimethylcyclopentadienyl) zirconium dichloride singly as the transition metal compound catalyst component and varying the fed gas composition, to prepare an ethylene/1-butene copolymer (A-5).

Physical properties of the thus obtained copolymer are set forth in Table 1.

[Preparation of a Composition]

The procedure of Example 1 was repeated except for using the ethylene/1-butene copolymer (A-5) prepared above, to obtain an ethylene type copolymer composition.

[Preparation of Film]

The procedure of Example 1 was repeated except for using the ethylene type copolymer composition prepared above, to form a film having a thickness of 30 μm.

Melt properties of the ethylene type copolymer composition and physical properties of the film formed from the composition are set forth in Table 3.

Comparative Example 4

The procedure of Example 1 was repeated except for using the ethylene/1-butene copolymer (A-5) prepared in Comparative Example 3, to form a film having a thickness of 30 μm.

Melt properties of the copolymer and physical properties of the film formed from the copolymer are set forth in Table 3.

As is evident from comparison between Examples, Reference Examples and Comparative Examples, by the blend of the high pressure polymerization low-density polyethylene to the ethylene/1-butene copolymer, the compositions were improved in moldability (MT) and the film obtained therefrom was excellent in transparency.

Further, from the comparison between the composition obtained in Example 3 and the compositions obtained in Comparative Examples 1 and 3, those having almost the same MFR, the composition obtained in Example 3 was superior in the moldability (MT) to those of the compositions obtained in Comparative Examples 1 and 3.

The relationship between MFR and MT of the ethylene type copolymer composition of the present invention and the relationship between MFR and MT of the conventional ethylene type copolymer composition are shown in FIG. 1.

The transition metal compound catalyst components used in Examples contained both the transition metal compound catalyst component used in Comparative Example 1 and the transition metal compound catalyst component used in Comparative Example 3. As is evident from the fact, the ethylene copolymer composition containing the ethylene type copolymer prepared by using both the transition metal compound catalyst components was more improved in the moldability (MT) than the copolymer composition obtained by blending the high pressure polymerization low-density polyethylene with the ethylene type copolymer prepared by using each transition metal compound catalyst component singly.

TABLE 1

Ethylene/α-olefin copolymer (Component A)

| Code No. | Comonomer Kind | Comonomer Amount mol. % | Catalyst[*1] I/II by mol | MFR g/10-min | [η] dl/g | Mw/Mn | Density g/cm³ | n-Decane Soluble Portion wt % | Tm °C. | MT g | [*2] | FI S⁻¹ | [*3] | MT/(Mw/Mn) | [*4] |
|---|---|---|---|---|---|---|---|---|---|---|---|---|---|---|---|
| A-1 | 1-butene | 3.0 | 9/1 | 2.0 | 1.79 | 2.1 | 0.922 | 0.20 | 111.0 | 2.1 | 1.2 | 123 | 300 | 1.00 | 0 |
| A-2 | 1-butene | 2.5 | 8/2 | 1.6 | 1.88 | 2.4 | 0.925 | — | 111.4 | 3.5 | 1.5 | 84 | 240 | 1.46 | 0 |
| A-3 | 1-butene | 2.8 | 7/3 | 1.2 | 1.95 | 2.8 | 0.922 | — | 111.1 | 4.5 | 1.9 | 94 | 180 | 1.61 | 0 |
| A-4 | 1-butene | 2.4 | 10/0 | 1.1 | 2.07 | 2.0 | 0.925 | — | 111.4 | 1.4 | 2.0 | 62 | 165 | 0.70 | 0 |
| A-5 | 1-butene | 2.4 | 0/10 | 1.1 | 1.58 | 2.7 | 0.926 | 0.57 | 111.5 | 3.5 | 2.0 | 190 | 165 | 1.30 | 2.18 |

[*1]Transition metal compound catalyst component
I: bis (1,3-n-butylmethylcyclopentadienyl) zirconium dichloride
II: bis (1,3-dimethylcyclopentadienyl) zirconium dichloride
[*2]value of $2.2 \times MFR^{-0.84}$
[*3]value of $150 \times MFR$
[*4]value of $0.03 \times FI/MFR^{-3.0}$ (In the case of less than 0, the value is taken as 0.)

TABLE 2

High pressure radical polymerization low-density polyethylene (Component B)

| | | | Physical Properties of Film | | |
|---|---|---|---|---|---|
| Code No. | MFR g/10 min | Density g/cm³ | Haze % | Gloss % | Impact Strength kg · cm/cm |
| B-1 | 0.57 | 0.920 | 7.4 | 51 | 1,750 |

Preparation Example 4

[Preparation of a Catalyst Component]

5.0 kg of silica having been dried at 250° C. for 10 hours was suspended in 80 liters of toluene, and the resultant suspension was cooled to 0° C. Thereafter, to the suspension was dropwise added 28.7 liters of a toluene solution of methylaluminoxane (Al: 1.33 mol/l) over a period of 1 hour. During the addition, the temperature of the system was kept at 0° C. The reaction was successively carried out at 0° C. for 30 minutes. Then, the temperature of the system was elevated to 95° C. over a period of 1.5 hours, and at the same temperature the reaction was conducted for 20 hours. After

TABLE 3

| | Component A Code No. | Component B Code No. | Mixing Ratio A/B (by weight) | Melt Properties MFR g/10 min | Melt Properties MT g | Melt Properties FI s⁻¹ | Physical Properties of Film Haze % | Physical Properties of Film Gloss % | Physical Properties of Film Impact Strength kg · cm/cm | Moldability * |
|---|---|---|---|---|---|---|---|---|---|---|
| Ex. 1 | A-1 | B-1 | 90/10 | 1.7 | 3.7 | 137 | 3.2 | 104 | 1,690 | AA |
| Ref. Ex. 1 | A-1 | — | 100/0 | 2.0 | 2.1 | 123 | 4.2 | 105 | 1,650 | BB |
| Ex. 2 | A-2 | B-1 | 90/10 | 1.4 | 5.1 | 112 | 4.5 | 75 | 1,760 | AA |
| Ref. Ex. 2 | A-2 | — | 100/0 | 1.6 | 3.5 | 64 | 4.6 | 62 | 1,720 | AA |
| Ex. 3 | A-3 | B-1 | 90/10 | 1.0 | 8.6 | 100 | 6.0 | 44 | 1,790 | AA |
| Ref. Ex. 3 | A-3 | — | 100/0 | 1.2 | 4.5 | 94 | 6.5 | 55 | 1,940 | AA |
| Comp Ex. 1 | A-4 | B-1 | 90/10 | 1.0 | 4.0 | 65 | 3.4 | 101 | 1,790 | AA |
| Comp Ex. 2 | A-4 | — | 100/0 | 1.1 | 1.4 | 62 | 12.4 | 37 | 1,640 | CC |
| Comp Ex. 3 | A-5 | B-1 | 90/10 | 1.0 | 4.4 | 190 | 6.0 | 70 | 1,700 | AA |
| Comp Ex. 4 | A-5 | — | 100/0 | 1.1 | 3.5 | 190 | 7.2 | 63 | 1,720 | AA |

* Moldability
AA: MT ≧ 3 g
BB: 2 g ≦ MT < 3 g
CC: MT < 2 g that, the temperature of the system was lowered to 60° C., and the supernatant liquid was removed by decantation.

The solid portion obtained above was washed twice with toluene and then again suspended in 80 liters of toluene. To the reaction system were dropwise added 6.6 liters of a toluene solution of bis(1,3-n-butylmethylcyclopentadienyl) zirconium dichloride (Zr: 34.0 mmol/l) and 2.0 liters of a toluene solution of bis(1,3-dimethylcyclopentadienyl) zirconium dichloride (Zr: 28.1 mmol/l) at 80° C. over a period of 30 minutes, and the reaction was further carried out at 80° C. for 2 hours. Then, the supernatant liquid was removed, and the residue was washed twice with hexane to obtain a solid catalyst containing zirconium in an amount of 3.6 mg per 1 g of the solid catalyst.

[Preparation of a Prepolymerized Catalyst]

To 85 liters of hexane containing 1.7 mol of triisobutylaluminum were added 0.85 kg of the solid catalyst obtained above and 255 g of 1-hexene. The resultant mixture was subjected to prepolymerization with ethylene at 35° C. for 12 hours to obtain a prepolymerized catalyst in which polyethylene was prepolymerized in an amount of 10 g per 1 g of the solid catalyst. This ethylene polymer had an intrinsic viscosity [η] of 1.74 dl/g.

[Polymerization]

In a fluidized bed gas phase polymerizer of continuous type, ethylene was copolymerized with 1-hexene at the total pressure of 20 kg/cm$^2$-G and a polymerization temperature of 80° C. To the polymerizer were continuously fed the prepolymerized catalyst prepared above at a feed rate of 0.18 mmol/hr in terms of zirconium atom and triisobutylaluminum at a feed rate of 10 mmol/hr while continuously feeding ethylene, 1-hexene, hydrogen and nitrogen to maintain a constant gas composition (gas composition: 1-hexene/ethylene=0.030, hydrogen/ethylene=4.1×10$^{-4}$, ethylene concentration=23%) during the polymerization.

Thus, an ethylene/1-hexene copolymer (A-6) was obtained in an amount of 5.6 kg/hr. The copolymer had MFR of 1.4 g/10 min, a density of 0.924 g/cm$^3$ and a decane-soluble portion quantity at room temperature of 0.08% by weight.

Physical properties of the ethylene/1-hexene copolymer (A-6) are set forth in Table 4.

Reference Example 4

The procedure of Example 1 was repeated except for using the ethylene/1-hexene copolymer (A-6) prepared in Preparation Example 4, to form a film having a thickness of 30 μm.

Melt properties of the copolymer and physical properties of the film formed from the copolymer are set forth in Table 6.

Example 4

The ethylene/1-hexene copolymer (A-6) prepared in Preparation Example 4 and a high-density polyethylene (B-2) set forth in Table 5 were blended in a weight ratio of 90/10 [(A-6)/(B-2)] in the same manner as in Example 1, to prepare an ethylene type copolymer composition.

The ethylene type copolymer composition was subjected to inflation in the same manner as described in Example 1 to form a film having a thickness of 30 μm.

Melt properties of the ethylene type copolymer composition and physical properties of the film formed from the composition are set forth in Table 6.

As is evident from Table 6, as compared to the copolymer of Reference Example 4, the ethylene type copolymer composition was improved in the flow index (FI) within high-shear region, and an inflation film of high rigidity was obtained from this composition.

Example 5

The ethylene/1-hexene copolymer (A-6) prepared in Preparation Example 4 and a high-density polyethylene (B-3) set forth in Table 5 were blended in a weight ratio of 90/10 [(A-6)/(B-3)] in the same manner as in Example 1, to prepare an ethylene type copolymer composition.

The ethylene type copolymer composition was subjected to inflation in the same manner as described in Example 1 to form a film having a thickness of 30 μm.

Melt properties of the ethylene type copolymer composition and physical properties of the film formed from the composition are set forth in Table 6.

As is evident from Table 6 as compared to the copolymer of Reference Example 4, the ethylene type copolymer composition was improved in flow index (FI) within high-shear region, and an inflation film of high rigidity was obtained from this composition.

Example 6

The ethylene/1-hexene copolymer (A-6) prepared in Preparation Example 4 and a propylene/butene random copolymer (B-4) set forth in Table 5 were blended in a weight ratio of 90/10 [(A-6)/(B-4)] in the same manner as in Example 1, to prepare an ethylene type copolymer composition.

The ethylene type copolymer composition was subjected to inflation in the same manner as described in Example 1 to form a film having a thickness of 30 μm.

Melt properties of the ethylene type copolymer composition and physical properties of the film formed from the composition are set forth in Table 6.

As is evident from Table 6, as compared to the copolymer of Reference Example 4, the ethylene type copolymer composition was improved in flow index (FI) within high-shear region, and an inflation film of high rigidity was obtained from this composition.

Example 7

The ethylene/1-hexene copolymer (A-6) prepared in Preparation Example 4 and polypropylene (B-5) set forth in Table 5 were blended in a weight ratio of 90/10 [(A-6)/(B-5)] in the same manner as in Example 1, to prepare an ethylene type copolymer composition.

The ethylene type copolymer composition was subjected to inflation in the same manner as described in Example 1 to form a film having a thickness of 30 μm.

Melt properties of the ethylene type copolymer composition and physical properties of the film formed from the composition are set forth in Table 6.

As is evident from Table 6, as compared to the copolymer of Reference Example 4, the ethylene type copolymer composition was improved in flow index (FI) within high-shear region, and an inflation film of high rigidity was obtained from this composition.

Example 8

The ethylene/1-hexene copolymer (A-6) prepared in Preparation Example 4 and polybutene-1 (B-6) set forth in Table 5 were blended in a weight ratio of 90/10 [(A-6)/(B-6)] in the same manner as in Example 1, to prepare an ethylene type copolymer composition.

The ethylene type copolymer composition was subjected to inflation in the same manner as described in Example 1 to form a film having a thickness of 30 μm.

Melt properties of the ethylene type copolymer composition and physical properties of the film formed from the composition are set forth in Table 6.

As is evident from Table 6, as compared to the copolymer of Reference Example 4, the ethylene type copolymer composition was improved in flow index (FI) within high-shear region, and an inflation film of high rigidity was obtained from this composition.

TABLE 4

Ethylene/α-olefin copolymer

| Code No. | Co-monomer | Co-monomer Amount mol. % | MFR g/10 min | Mw/Mn | Density g/cm³ | Decane Soluble Portion wt % | Tm °C. | MT g | *1 | FI s⁻¹ | *2 | MT/ (Mw/Mn) | *3 |
|---|---|---|---|---|---|---|---|---|---|---|---|---|---|
| A-6 | 1-hexene | 2.6 | 1.4 | 2.5 | 0.924 | 0.08 | 115.0 | 3.1 | 1.7 | 138 | 210 | 1.24 | 0 |

*¹value of $2.2 \times MFR^{-0.84}$
*²value of $150 \times MFR$
*³value of $0.03 \times FI/MFR-3.0$ (In the case of less than 0, the value is taken as 0.)

TABLE 5

Crystalline Polyolefin

| Code No. | Composition (mol %) | | | MFR g/10 min | Density g/cm³ |
|---|---|---|---|---|---|
| | Ethylene | Propylene | Butene | | |
| B-2 | 100 | — | — | 5.0 | 0.968 |
| B-3 | 99.8 | — | 0.2 | 0.65 | 0.963 |
| B-4 | 2.4 | 95.0 | 1.6 | 6.8 | 0.910 |
| B-5 | — | 100 | — | 6.5 | 0.910 |
| B-6 | 1.5 | — | 98.5 | 2.0 | 0.908 |

MFR of B-2 and B-3 were measured at 190° C.
MFR of B-4, B-5 and B-6 were measured at 230° C.

the same manner as in Example 1, to prepare an ethylene type copolymer composition.

The ethylene type copolymer composition was subjected to inflation in the same manner as described in Example 1 to form a film having a thickness of 30 μm.

Melt properties of the ethylene type copolymer composition and physical properties of the film formed from the composition are set forth in Table 8.

As is evident from Table 8, as compared to the copolymer in Reference Example 4, the ethylene type copolymer composition was improved in moldability (MT), and an inflation film having high transparency and high film impact was obtained from this composition.

Example 10

The ethylene/1-hexene copolymer (A-6) prepared in Preparation Example 4 and the ethylene/propylene/ethylidenenorbornene type elastomer (B-8) set forth in Table 7 were blended in a weight ratio of 90/10 [(A-6)/(B-8)] in the same manner as in Example 1, to prepare an ethylene type copolymer composition.

The ethylene type copolymer composition was subjected to inflation in the same manner as described in Example 1, to form a film having a thickness of 30 μm.

Melt properties of the ethylene type copolymer composition and physical properties of the film formed from the composition are set forth in Table 8.

TABLE 6

| | Compo-nent A Code No. | Compo-nent B Code No. | Mixing Ratio A/B (by weight) | Melt Properties of Composition | | | | Physical Properties of Film | | | |
|---|---|---|---|---|---|---|---|---|---|---|---|
| | | | | MFR g/10 min | MT g | FI s⁻¹ | Haze % | Tension Test (MD) | | Tension Test (TD) | |
| | | | | | | | | YM kg/cm² | EL % | YM kg/cm² | EL % |
| Ref. Ex. 4 | A-6 | — | 100/0 | 1.4 | 3.1 | 138 | 5.6 | 3,200 | 550 | 3,400 | 640 |
| Ex. 4 | A-6 | B-2 | 90/10 | 1.5 | 3.1 | 165 | 5.4 | 4,000 | 590 | 5,200 | 620 |
| Ex. 5 | A-6 | B-3 | 90/10 | 1.3 | 3.4 | 172 | 6.2 | 3,900 | 580 | 5,000 | 670 |
| Ex. 6 | A-6 | B-4 | 90/10 | 1.5 | 3.1 | 290 | 6.0 | 5,200 | 560 | 6,600 | 600 |
| Ex. 7 | A-6 | B-5 | 90/10 | 1.5 | 3.1 | 190 | 6.1 | 5,400 | 570 | 7,200 | 580 |
| Ex. 8 | A-6 | B-6 | 90/10 | 1.4 | 3.2 | 243 | 7.3 | 3,500 | 550 | 3,700 | 630 |

Example 9

The ethylene/1-hexene copolymer (A-6) prepared in Preparation Example 4 and the ethylene/1-butene/ethylidenenorbornene type elastomer (B-7) set forth in Table 7 were blended in a weight ratio of 90/10 [(A-6)/(B-7)] in As is evident from Table 8, as compared to the copolymer of Reference Example 4, the ethylene type copolymer composition was improved in moldability (MT), and an inflation film having high transparency and high film impact was obtained from this composition.

TABLE 7

| | Olefin Type Elastomer | | | | | |
|---|---|---|---|---|---|---|
| | Composition | | | | MFR 190° C. | |
| Code No. | Ethylene | (mol %) Propylene | Butene | ENB | g/10 min | Density g/cm³ |
| B-7 | 88 | — | 10 | 2 | 1.5 | 0.89 |
| B-8 | 74 | 24 | — | 2 | 0.2 | 0.87 |

ENB: ethylidenenorbornene

TABLE 8

| | Compo-nent A | Compo-nent B | Mixing Ratio A/B | Melt properties of Composition | | | Physical Properties of Film | |
|---|---|---|---|---|---|---|---|---|
| | Code No. | Code No. | (by weight) | MFR g/10 min | MT g | FI s⁻¹ | Haze % | Film Impact kg · cm/cm |
| Ref. Ex. 4 | A-6 | — | 100/0 | 1.4 | 3.1 | 138 | 5.6 | 3,320 |
| Ex. 9 | A-6 | B-7 | 90/10 | 1.4 | 4.7 | 149 | 4.7 | 4,020 |
| Ex. 10 | A-6 | B-8 | 90/10 | 1.2 | 4.6 | 140 | 4.9 | 4,100 |

Preparation Example 5

[Polymerization]

In a fluidized bed gas phase polymerizer of continuous type, ethylene was copolymerized with 1-hexene at the total pressure of 20 kg/cm²-G and a polymerization temperature of 80° C. To the polymerizer were continuously fed the prepolymerized catalyst prepared in Preparation Example 4 at a feed rate of 0.18 mmol/hr in terms of zirconium atom and triisobutylaluminum at a feed rate of 10 mmol/hr while continuously feeding ethylene, 1-hexene, hydrogen and nitrogen to maintain a constant gas composition (gas composition: 1-hexene/ethylene=0.030, hydrogen/ethylene= $5.5 \times 10^{-4}$, ethylene concentration=25%) during the polymerization.

Thus, an ethylene/1-hexene copolymer (A-7) was obtained in an amount of 6.0 kg/hr. The copolymer had MFR of 2.1 g/10 min, and a density of 0.923 g/cm³.

Physical properties of the ethylene/1-hexene copolymer (A-7) are set forth in Table 1.

Preparation Example 6

[Preparation of a Modified Polyethylene]

750 g of the polyethylene (prepared by polymerizing ethylene by using commercially available titanium catalyst, density: 0.965 g/cm³, MFR: 15.0 g/10 min) was dissolved at 160° C. in 5.7 liters of toluene as a reaction solvent.

Then, to the resultant solution were slowly added a toluene solution of maleic anhydride (44.1 g/250 ml) and a toluene solution of dicumyl peroxide (DCP) (3.6 g/50 ml) over a period of 4 hours through different conduits.

After the addition was completed, the reaction was further continued for 30 minutes at 160° C. Then, the temperature of the system was cooled to room temperature to precipitate a polymer. The precipitated polymer was filtered, then repeatedly washed with acetone and dried at 80° C. for one day and night under a reduced pressure, to obtain an aimed modified polyethylene (B-9).

The modified polyethylene (B-9) was subjected to elemental analysis to determine the graft amount of the maleic anhydride. As a result, in the modified polyethylene, maleic anhydride was graft polymerized in an amount of 2.3 g per 100 g of the modified polyethylene. Further, the modified polyethylene had a density of 0.965 g/cm³ and MFR of 4.1 g/10 min.

Example 11

The ethylene/1-hexene copolymer (A-7) (Density: 0.923 g/cm³, MFR: 2.1 g/10 min) prepared in Preparation Example 5 and the modified polyethylene (B-9) prepared in Preparation Example 6 were dry blended in a mixing ratio of 95/5 [(A-7)/(B-9)] in the same manner as in Example 1, to obtain an ethylene type copolymer composition.

The ethylene type copolymer composition obtained had a density of 0.925 g/cm³ and a MFR of 2.2 g/10 min.

Melt properties and other properties of the ethylene type copolymer composition were measured and the results are set forth in Table 10.

[Molding of a Pressed Sheet]

The ethylene type copolymer composition was heated at 200° C. for 10 minutes by a press molding machine. Then, the copolymer was held under a pressure of 100 kg/cm² for 3 minutes and was further held under a pressure of 100 kg/cm² for 5 minutes using a cooled pressing machine of 20° C. to mold the copolymer composition into a pressed sheet.

The pressed sheet was measured on various properties such as transparency and adhesion strength to an aluminum foil or to a 6-nylon sheet. The results are set forth in Table 10.

As is evident from the results set forth in Table 10, the composition has a good transparency and shows a high moldability owing to high melt tension. Further, the composition is excellent in the adhesion strength to highly polar materials such as aluminum and nylon.

TABLE 9

Ethylene/α-olefin Copolymer

| Code No. | Co-monomer | Co-monomer Content mol % | MFR g/10 min | [η] dl/g | Mw/Mn | Density g/cm³ | Decane Soluble Portion wt % | Tm °C. | MT g | *1 | FI s⁻¹ | *2 | MT/(Mw/Mn) | *3 |
|---|---|---|---|---|---|---|---|---|---|---|---|---|---|---|
| A-7 | 1-hexene | 2.9 | 2.1 | 1.64 | 2.6 | 0.923 | 0.26 | 114.5 | 2.1 | 1.2 | 212 | 315 | 0.81 | 0.03 |

*1 value of $2.2 \times MFR^{-0.84}$
*2 value of $150 \times MFR$
*3 value of $0.03 \times FI/MFR - 3.0$ (In case of less than 0, the value is taken as 0.)

TABLE 10

| | Compo-nent A Code No. | Compo-nent B Code No. | Mixing Ratio A/B (by wt) | Den-sity g/cm³ | Ethylene Copolymer Composition | | | | Adhesion to Adherend | |
|---|---|---|---|---|---|---|---|---|---|---|
| | | | | | MFR g/10 min | MT g | FI s⁻¹ | Haze % | to Aluminum kg/25 mm | to 6-Nylon kg/25 mm |
| Ex. 11 | A-7 | B-9 | 95/5 | 0.925 | 2.2 | 2.0 | 214 | 55 | 15.1 | 21.0 |

Preparation Example 7

[Polymerization]

In a fluidized bed gas phase polymerizer of continuous type, ethylene was copolymerized with 1-hexene at the total pressure of 20 kg/cm²-G and a polymerization temperature of 70° C. To the polymerizer were continuously fed the prepolymerized catalyst prepared in Preparation Example 4 at a feed rate of 0.18 mmol/hr in terms of zirconium atom and triisobutylaluminum at a feed rate of 10 mmol/hr while continuously feeding ethylene, 1-hexene, hydrogen and nitrogen to maintain a constant gas composition (gas composition: 1-hexene/ethylene=0.032, hydrogen/ethylene= $4.5 \times 10^{-4}$, ethylene concentration=25%) during the polymerization.

Thus, an ethylene/1-hexene copolymer (A-8) was obtained in an amount of 6.3 kg/hr. The copolymer had MFR of 0.40 g/10 min, a density of 0.908 g/cm³ and a decane-soluble portion quantity at room temperature of 0.54% by weight.

Example 12

The ethylene/1-hexene copolymer (A-8) prepared in Preparation Example 7 and an ethylene/1-hexene copolymer (A-9) prepared in the same manner as in Preparation Example 7 except for varying the composition ratio of the mixed gas were melt kneaded in a weight ratio of 60/40 [(A-8)/(A-9)], to obtain an ethylene/α-olefin copolymer composition (L-1).

The physical properties of the ethylene/1-hexene copolymer (A-9) are set forth in Table 11 and the physical properties of the ethylene/α-olefin copolymer composition (L-1) are set forth in Table 12.

The ethylene/α-olefin copolymer composition (L-1) and the high pressure radical polymerization low-density polyethylene (B-10) set forth in Table 13 were dry blended in a mixing ratio of 90/10 [(L-1)/(B-10)] in the same manner as in Example 1, to obtain an ethylene type copolymer composition.

The ethylene type copolymer composition was subjected to inflation in the same manner as in Example 1, to form a film having a thickness of 30 μm.

Melt properties of the ethylene type copolymer composition and physical properties of the film formed from the composition are set forth in Table 14.

As is evident from Table 14, the ethylene type copolymer composition was excellent in moldability (MT) and the flow index (FI) within high-shear region and the inflation film excellent in optical characteristics and film impact was obtained from the composition.

Reference Example 5

The ethylene/α-olefin copolymer composition (L-1) prepared in Example 12 was subjected to inflation in the same manner as in Example 1, to form a film having a thickness of 30 μm.

Melt properties of the ethylene type copolymer composition and physical properties of the film formed from the composition are set forth in Table 14.

As is evident from comparison between Example 12 and Reference Example 5, by incorporating the high pressure radical polymerization low-density polyethylene to the composition of Example 12, the composition was improved in moldability (MT) and the film obtained therefrom was improved in optical characteristics.

Comparative Example 5

An ethylene/1-hexene copolymer (A-10) and an ethylene/1-hexene copolymer (A-11), both having been prepared in the same manner as described in Preparation Example 7 except for using bis(1,3-dimethylcyclopentadienyl) zirconium dichloride singly as the zirconium compound in the catalyst component and varying the composition ratio of the mixed gas, were melt kneaded in a weight ratio of 60/40 [(A-10)/(A-11)], to obtain an ethylene/α-olefin copolymer composition (L-2).

The physical properties of the ethylene/α-olefin copolymer composition (L-2) are set forth in Table 12.

The ethylene/α-olefin copolymer composition (L-2) and the high pressure radical polymerization low-density polyethylene (B-10) set forth in Table 13 were blended in a mixing ratio of 90/10 [(L-2)/(B-10)] in the same manner as in Example 1, to obtain an ethylene type copolymer composition.

The ethylene type copolymer composition was subjected to inflation in the same manner as described in Example 1 to form a film having a thickness of 30 μm.

Melt properties of the ethylene type copolymer composition and physical properties of the film formed from the composition are set forth in Table 14.

Comparative Example 6

The ethylene/α-olefin copolymer composition (L-2) obtained in Comparative Example 5 was subjected to inflation in the same manner as described in Example 1 to form a film having a thickness of 30 μm.

Melt properties of the ethylene type copolymer composition and physical properties of the film formed from the composition are set forth in Table 14.

As is evident from comparison between Example 12, Reference Example 5 and Comparative Examples 5 and 6, by incorporating the high pressure radical polymerization low-density polyethylene to the composition of Example 12, the composition was improved in moldability (MT) and the film obtained therefrom was improved in optical characteristics.

Comparative Example 7

An ethylene/1-hexene copolymer (A-12) and an ethylene/1-hexene copolymer (A-13), both having been prepared in the same manner as described in Preparation Example 7 except for using bis(1,3-n-butylmethylcyclopentadienyl) zirconium dichloride singly as the zirconium compound in the catalyst component and varying the composition ratio of the mixed gas, were melt kneaded in a weight ratio of 60/40 [(A-12)/(A-13)], to obtain an ethylene/α-olefin copolymer composition (L-3).

The physical properties of the ethylene/α-olefin copolymer composition (L-3) are set forth in Table 12.

The ethylene/α-olefin copolymer composition (L-3) and the high pressure radical polymerization low-density polyethylene (B-10) set forth in Table 13 were blended in a mixing ratio of 90/10 [(L-3)/(B-10)] in the same manner as in Example 1, to obtain an ethylene type copolymer composition.

The ethylene type copolymer composition was subjected to inflation in the same manner as described in Example 1 to form a film having a thickness of 30 μm.

Melt properties of the ethylene type copolymer composition and physical properties of the film formed from the composition are set forth in Table 14.

Comparative Example 8

The ethylene/α-olefin copolymer composition (L-3) obtained in Comparative Example 7 was subjected to inflation in the same manner as described in Example 1 to form a film having a thickness of 30 μm.

Melt properties of the ethylene type copolymer composition and physical properties of the film formed from the composition are set forth in Table 14.

As is evident from comparison between Example 12, Reference Example 5 and Comparative Examples 7 and 8, by incorporating the high pressure radical polymerization low-density polyethylene to the composition of Example 12, the composition was improved in moldability (MT).

Example 13

The ethylene/1-hexene copolymer (A-8) obtained in Preparation Example 7 and the ethylene/1-hexene copolymer (A-13) as described above were melt kneaded in a weight ratio of 70/30 [(A-8)/(A-13)], to obtain an ethylene/α-olefin copolymer composition (L-4).

Physical properties of the ethylene/α-olefin copolymer composition (L-4) are set forth in Table 12.

The procedure as in Example 12 was repeated except for using the ethylene/α-olefin copolymer composition (L-4) instead of the ethylene/α-olefin copolymer composition (L-1), to obtain an ethylene type copolymer composition.

The ethylene type copolymer composition was subjected to inflation in the same manner as in Example 1, to form a film having a thickness of 30 μm.

Melt properties of the ethylene type copolymer composition and physical properties of the film formed from the composition are set forth in Table 14.

As is evident from Table 14, the ethylene type copolymer composition was improved in the flow index (FI) within high shear region and the inflation film improved in optical characteristics and film impact was obtained from the composition.

Reference Example 6

The ethylene/α-olefin copolymer composition (L-4) was subjected to inflation in the same manner as in Example 1, to form a film having a thickness of 30 μm.

Melt properties of the ethylene type copolymer composition and physical properties of the film formed from the composition are set forth in Table 14.

As is evident from comparison between Example 13 and Reference Example 6, by incorporating the high pressure radical polymerization low-density polyethylene to the composition of Example 13, the composition was improved in moldability (MT) and the film obtained therefrom was excellent in optical characteristics.

TABLE 11

| Code No. | Comonomer Kind | Comonomer Content mol. % | Catalyst [*1] I/II by mol | Density g/cm³ | MFR g/10-min | [η] dl/g | Mw/Mn | Tm °C. | MT g | [*2] | FI s⁻¹ | [*3] | Decane Soluble Portion wt % | MT/(Mw/Mn) | [*4] |
|---|---|---|---|---|---|---|---|---|---|---|---|---|---|---|---|
| A-8 | 1-hexene | — | 8/2 | 0.908 | 0.40 | 2.00 | 2.5 | 93.0 | 5.7 | 4.7 | 48 | 60 | 0.54 | 2.28 | 0.60 |
| A-9 | 1-hexene | — | 8/2 | 0.943 | 180 | 0.68 | — | 118.6 | <0.1 | — | 13,000 | — | 0.69 | — | — |

TABLE 11-continued

| Code No. | Comonomer Kind | Content mol. % | Catalyst *1 I/II by mol | Density g/cm³ | MFR g/10-min | [η] dl/g | Mw/Mn | Tm °C. | MT g | *2 | FI s⁻¹ | *3 | Decane Soluble Portion wt % | MT/(Mw/Mn) | *4 |
|---|---|---|---|---|---|---|---|---|---|---|---|---|---|---|---|
| A-10 | 1-hexene | 4.8 | 0/10 | 0.907 | 0.35 | 1.88 | 3.5 | 92.8 | 5.9 | 5.3 | 92 | 53 | 0.55 | 1.69 | 4.89 |
| A-11 | 1-hexene | 1.0 | 0/10 | 0.943 | 165 | 0.70 | — | 116.6 | <0.1 | — | 12,400 | — | 0.45 | — | — |
| A-12 | 1-hexene | — | 10/0 | 0.909 | 0.46 | 2.30 | 3.1 | 93.1 | 3.6 | 4.2 | 30 | 69 | 0.52 | 1.16 | 0 |
| A-13 | 1-hexene | — | 10/0 | 0.943 | 170 | 0.68 | — | 118.5 | <0.1 | — | 13,500 | — | 0.44 | — | — |

*¹Transition metal compound catalyst component
I: bis (1,3-n-butylmethylcyclopentadienyl) zirconium dichloride
II: bis (1,3-dimethylcyclopentadienyl) zirconium dichloride
*²value of $2.2 \times MFR^{-0.84}$
*³value of $150 \times MFR$
*⁴value of $0.03 \times FI/MFR - 3.0$ (In the case of less than 0, the value is taken as 0.)

TABLE 12

| | Component A | | Mixing Ratio | Melt properties | | |
|---|---|---|---|---|---|---|
| Code No. | Code No. | Code No. | A/B (by weight) | Density d g/cm³ | MFR g/10 min | MT g | FI s⁻¹ |
| L-1 | A-8 | A-9 | 60/40 | 0.922 | 1.9 | 2.2 | 410 |
| L-2 | A-10 | A-11 | 60/40 | 0.921 | 2.0 | 1.9 | 520 |
| L-3 | A-12 | A-13 | 60/40 | 0.922 | 1.9 | 0.9 | 230 |
| L-4 | A-8 | A-13 | 70/30 | 0.917 | 1.2 | 3.8 | 360 |

TABLE 13

| HPLD | MFR g/10 min. | Density g/cm³ | Physical Properties of Film Haze % | Film Impact kg · cm/cm |
|---|---|---|---|---|
| B-10 | 0.50 | 0.924 | 7.4 | 1,750 |

TABLE 14

| | L Code No. | H Code No. | Mixing Ratio A/B (by weight) | Melt Properties of Ethylene Copolymer Composition | | | Physical Properties of Film | | | |
|---|---|---|---|---|---|---|---|---|---|---|
| | | | | MFR g/10 min | MT g | FI s⁻¹ | Haze % | Gloss % | Impact Strength kg · cm/cm | Moldability *2 |
| Ex. 12 | L-1 | B-10 | 90/10 | 1.7 | 3.4 | 430 | 4.3 | 86 | 4,100 | AA |
| Ref. Ex. 5 | L-1 | — | 100/0 | 1.9 | 2.2 | 410 | 8.1 | 67 | 6,930 | BB |
| Comp. Ex. 5 | L-2 | B-10 | 90/10 | 1.8 | 3.2 | 520 | 8.9 | 60 | 3,450 | AA |
| Comp. Ex. 6 | L-2 | — | 100/0 | 2.0 | 1.9 | 520 | 10.5 | 54 | 5,770 | CC |
| Comp. Ex. 7 | L-3 | B-10 | 90/10 | 1.7 | 2.5 | 280 | 4.9 | 83 | 6,120 | BB |
| Comp. Ex. 8 | L-3 | — | 100/0 | 1.9 | 0.9 | 260 | 25.1 | 18 | NB*1 | CC |

TABLE 14-continued

| | L Code No. | H Code No. | Mixing Ratio A/B (by weight) | Melt Properties of Ethylene Copolymer Composition | | | Physical Properties of Film | | | Mold-ability *2 |
|---|---|---|---|---|---|---|---|---|---|---|
| | | | | MFR g/10 min | MT g | FI s⁻¹ | Haze % | Gloss % | Impact Strength kg · cm/cm | |
| Ex. 13 | L-4 | B-10 | 90/10 | 1.1 | 5.0 | 240 | 4.0 | 88 | NB | AA |
| Ref. Ex. 6 | L-4 | — | 100/0 | 1.2 | 3.8 | 230 | 7.6 | 70 | NB | *AA |

*1 NB = not broken (film impact >8,500 kg · cm/cm)
*2 Moldability
AA: MT ≧ 3 g
BB: 2 g ≦ MT < 3 g
CC: MT < 2 g

Example 14

The ethylene/1-hexene copolymer (A-8) (density: 0.908 g/cm$^3$, MFR: 0.40 g/10 min) prepared in Preparation Example 7, an ethylene/1-hexene copolymer (A-9) prepared in the same manner as described in Preparation Example 7 except for adjusting the density and MFR of the copolymer to those set forth in Table 11 and the modified polyethylene (B-9) obtained in Preparation Example 6 were blended in a mixing ratio of 57/38/5 [(A-8)/(A-9)/(B-9)] in the same manner as in Example 1, to obtain an ethylene type copolymer composition.

The ethylene type copolymer composition had a density of 0.924 g/cm$^3$ and MFR of 2.0 g/10 min. The results are shown in Table 15.

[Molding of a Pressed Sheet]

Using a press molding machine, a pressed sheet was prepared in the same manner as in Example 11.

The pressed sheet was measured on various properties such as transparency and adhesion strength to an aluminum foil or to a 6-nylon sheet. The results are set forth in Table 15.

As is evident from the results set forth in Table 15, the composition has a good transparency and shows a high moldability owing to high melt tension and high flow index. Further, the composition is excellent in the adhesion strength to highly polar materials such as aluminum and nylon.

TABLE 15

| | Component A$^1$ Code No. | Component A$^2$ Code No. | Component B Code No. | Mixing Ratio A$^1$/A$^2$/B (by wt) | Density d g/cm$^3$ | Ethylene Copolymer Composition | | | | Adhesion to Adherend | |
|---|---|---|---|---|---|---|---|---|---|---|---|
| | | | | | | MFR g/10 min | MT g | FI s⁻¹ | Haze % | to Aluminum kg/25 mm | to 6-Nylon kg/25 mm |
| Ex. 12 | A-8 | A-9 | B-9 | 57/38/5 | 0.924 | 2.0 | 2.1 | 420 | 56 | 15.7 | 22.9 |

What is claimed is:

1. An ethylene copolymer composition comprising:
   (A1) an ethylene/α-olefin copolymer in an amount of 60 to 99% by weight, which is obtained by copolymerizing ethylene with an α-olefin of 3 to 20 carbon atoms in the presence of a catalyst for olefin polymerization comprising (a) an organoaluminum oxy-compound and (b) at least two kinds of compounds of Group IV transition metals of the periodic table containing a ligand having a cyclopentadienyl skeleton, and which has such properties that:
   (i) the density is in the range of 0.850 to 0.980 g/cm$^3$,
   (ii) the melt flow rate (MFR) at 190° C. under a load of 2.16 kg is in the range of 0.01 to 200 g/10 min,
   (iii) the melt tension, MT, in grams, at 190° C. and the melt flow rate (MFR) satisfy the relation $MT > 2.2 \times MFR^{-0.84}$, and (iv) the flow index, FI, in 1/sec, defined by a shear rate which is given when a shear stress of molten copolymer at 190° C. reaches 2.4×10$^6$ dyne/cm$^2$ and the melt flow rate (MFR) satisfy the relation $FI < 150 \times MFR$; and (B3) an olefin type elastomer in an amount of 1 to 40% by weight, said elastomer having such properties that
   (i) the density (d) is not more than 0.900 g/cm$^3$, and
   (ii) the melt flow rate (MFR) at 190° C. under a load of 2.16 kg is in the range of 0.01 to 100 g/10 min;
   a density ratio ((B3)/(A1)) of the density of said olefin type elastomer (B3) to the density of said ethylene/α-olefin copolymer (A1) being less than 1.

2. An ethylene copolymer composition comprising:
   (A2) an ethylene/α-olefin copolymer in an amount of 60 to 99% by weight, which is obtained by copolymerizing ethylene with an α-olefin of 3 to 20 carbon atoms having such properties that:
   (i) the density is in the range of 0.850 to 0.980 g/cm$^3$,
   (ii) the melt flow rate (MFR) at 190° C. under a load of 2.16 kg is in the range of 0.01 to 200 g/10 min,
   (iii) the melt tension, MT, in grams, at 190° C. and the melt flow rate (MFR) satisfy the relation $MT > 2.2 \times MFR^{-0.84}$, and (iv) the flow index, FI, in 1/sec, defined by a shear rate which is given when a shear stress of molten copolymer at 190° C. reaches $2.4 \times 10^6$ dyne/cm² and the melt flow rate (MFR) satisfy the relation $FI < 150 \times MFR$, (v) the molecular weight distribution (Mw/Mn) measured by GPC is in the range of 1.5 to 4, and
(vi) MT/(Mw/Mn) and FI/MFR satisfy the relation MT/(Mw/Mn)>0.03×FI/MFR−3.0 with the proviso that when the value of 0.03×FI/MFR−3.0 is less than 0, it is taken as 0; and (B3) an olefin type elastomer in an amount of 1 to 40% by weight, said elastomer having such properties that
(i) the density (d) is not more than 0.900 g/cm³, and
(ii) the melt flow rate (MFR) at 190° C. under a load of 2.16 kg is in the range of 0.01 to 100 g/10 min;

a density ratio ((B3)/(A2)) of the density of said olefin type elastomer (B3) to the density of said ethylene/α-olefin copolymer (A2) being less than 1.

* * * * *